United States Patent
Jackson et al.

(10) Patent No.: US 8,229,840 B2
(45) Date of Patent: Jul. 24, 2012

(54) SHORT-TERM OPTION TRADING SYSTEM

(75) Inventors: Mark Daniel Jackson, Fort Collins, CO (US); David James Norman, Essex (GB)

(73) Assignee: Microtick LLC, Fort Collins, CO (US)

( * ) Notice: Subject to any disclaimer, the term of this patent is extended or adjusted under 35 U.S.C. 154(b) by 0 days.

(21) Appl. No.: 12/970,571

(22) Filed: Dec. 16, 2010

(65) Prior Publication Data

US 2011/0087586 A1  Apr. 14, 2011

Related U.S. Application Data

(63) Continuation of application No. 10/999,806, filed on Nov. 30, 2004, now Pat. No. 7,856,395.

(60) Provisional application No. 60/600,231, filed on Aug. 10, 2004.

(51) Int. Cl.
*G06Q 40/00* (2012.01)

(52) U.S. Cl. .............. 705/37; 705/4; 705/36 R; 705/39; 705/45

(58) Field of Classification Search .................. None
See application file for complete search history.

(56) References Cited

U.S. PATENT DOCUMENTS

| | | | |
|---|---|---|---|
| 6,829,589 B1 * | 12/2004 | Saliba | 705/36 R |
| 7,212,997 B1 * | 5/2007 | Pine et al | 705/36 R |
| 7,469,228 B2 | 12/2008 | Bonissone et al. | |
| 7,542,932 B2 | 6/2009 | Chalermkraivuth et al. | |
| 7,593,880 B2 | 9/2009 | Chalermkraivuth et al. | |
| 7,630,928 B2 | 12/2009 | Bonissone et al. | |
| 7,640,201 B2 | 12/2009 | Chalermkraivuth et al. | |
| 7,711,640 B2 * | 5/2010 | Claus et al. | 705/39 |
| 7,711,644 B2 * | 5/2010 | Claus et al. | 705/45 |
| 7,865,418 B2 * | 1/2011 | Uenohara et al. | 705/36 R |
| 2002/0091617 A1 | 7/2002 | Keith | |
| 2002/0161693 A1 * | 10/2002 | Greenwald | 705/37 |
| 2003/0144944 A1 * | 7/2003 | Kalt et al. | 705/37 |
| 2004/0199455 A1 * | 10/2004 | Saliba | 705/37 |
| 2007/0198387 A1 * | 8/2007 | Uenohara et al. | 705/36 R |
| 2008/0086408 A1 * | 4/2008 | Johnson et al. | 705/37 |
| 2009/0240535 A1 * | 9/2009 | Daughtery, III | 705/4 |
| 2010/0306133 A1 * | 12/2010 | Johnston et al. | 705/36 R |

FOREIGN PATENT DOCUMENTS

WO  WO03023647  *  3/2003

OTHER PUBLICATIONS

"OTC Derivatives: Taking Risk Management to New Hleghts."From the remarks of J. Carter Beese, Jr. (Commissioner of the U.S. Securites and Exchange Commision). Apr. 20, 1993.*
"OTC Derivatives: Taking Risk Management to New Heights." Remarks of Commissioner J. Carter Beese, Jr., U.S. Securities and Exchange Commission. London, England, Apr. 20, 1993.

* cited by examiner

*Primary Examiner* — Charles Kyle
*Assistant Examiner* — Robert Niquette
(74) *Attorney, Agent, or Firm* — Mark A. Litman and Associates, P.A.

(57) ABSTRACT

Option contracts are traded by valuing an option that has at least one of a) strike price or b) expiration time unknown at the time the option is valued. The previously unknown values of the option are assigned at the time or after the time the trade is completed. An implied underlying price stream is generated from the option prices through the use of feed back between market participants and the marketplace. The resulting system is useful in trading option contracts of short time duration.

7 Claims, 6 Drawing Sheets

SHORT-TERM OPTION TRADING SYSTEM

RELATED APPLICATIONS DATA

This application claims priority as a Continuation from U.S. patent application Ser. No. 10/999,806 filed 30 Nov. 2004, now U.S. Pat. No. 7,856,395, which in turn claims priority from U.S. Provisional Application Ser. No. 60/600,231, filed 10 Aug. 2001.

BACKGROUND TO THE INVENTION

1. Field of the Invention

The present invention relates to a system, method and means for pricing and trading short-term derivative instruments known as 'short-term option contracts' or 'micro-options' on the financial markets, commodity markets, foreign exchange markets or other types of commercial or retail marketplaces.

2. Background to the Art

An option contract is a derivative contract that conveys to its buyer or holder the right to take possession and ownership upon expiry or before expiry of shares, stock or commodities of an underlying good, service, security, commodity, or market index at a specified price, or strike price, on or before a given date (the expiration date). For purposes of convenience in this description, the term 'underlying goods' will be used to collectively and generically refer to these elements, without limiting the discussion specifically to a traditional material that one would call goods. The seller of the option grants this right to the buyer, usually at a specific price or cost. The seller of the option receives the premium paid by the buyer, but the seller must incur the risk of delivering the underlying instrument upon exercise of the option contract by a call buyer, or taking delivery of the underlying security upon exercise if a put seller. Option contracts are traded for a premium, which can be any price the buyer and the seller agree upon as being reasonable. Options are either calls (right to buy) or puts (right to sell). Herein, the term "underlying", "underlying instrument", "underlying good", "underlying security" or "underlying commodity" will be used when referring to the underlying existence and terms of an option contract, but it should be understood that these terms within the scope of this description can refer to any good, service, security, commodity, market index or other purchasable or tradable item of value or other asset.

Upon expiry, long option contracts are normally either exercised into a designated underlying instrument, abandoned or cash settled. This means that the buyer of a call option can opt to take possession of the underlying goods through exercising the buyer's right to buy the underlying goods or security at the designated strike price of the option. In some situations the buyer of an option can receive a cash payment upon exercising the option, the cash payment being equivalent to the difference between the strike price and an index price. This can occur, for example, in the case of a stock index option where the underlying goods do not represent a deliverable security. Some options allow the exercise of the option only at expiration (European options) while other options allow exercise anytime during the life of the option (American options). Typically, except in the case of a stock split or other circumstance that alters the composition of the option due to a change in the underlying instrument's standardized parameters, an option contract represents the option to buy or sell a specific number (e.g., 100) of shares of the underlying goods or security.

Option trading has been in existence for thousands of years. The Greeks, Romans and Phoenicians used options to insure merchandise shipments. 2500 years ago, Aristotle wrote about a Greek philosopher Thales who bought options on olive presses when he expected there to be a large olive harvest in the following season. In a publication entitled *The Confusion of Confusion*, written in 1688 in Spain, Don Jose de la Vega described an options contract, indicating that option contracts were traded on the Amsterdam Bourse as early as the $17^{th}$ century. Option contracts were in common use throughout the world by the $19^{th}$ century.

In America, the Put and Call Brokers and Dealers Association was formed in 1935 with 20 members who did most of the option writing in the country. These options were traded only in over-the-counter (OTC) markets and were traded informally on an as-needed basis. In an OTC options market, buyers indicate to their potential counter parties their exact requirements on strike price, expiration date and quantity of the underlying goods, and then the counter parties quote a premium for that option. OTC trades are transacted bilaterally between counter parties without the involvement of centralized exchanges or centralized clearing. As such, there is typically a higher degree of credit risk associated with an OTC trade and therefore preliminary negotiations may be needed to establish credit worthiness before buyer and the seller reach an agreement to trade.

Over-the-counter markets are in use today in various underlying instruments by clearing banks, investment banks, currency exchanges and brokerages, and because transactions are normally bilateral and confidential, the exact size and scope of the OTC market is not known. Some estimates are that the OTC options markets represent the largest segment of options trading today, though other estimates are not so optimistic. OTC bulletin board services are currently in use to facilitate OTC negotiations and trading. These services post dealer (member) quotations on the bulletin board for a service fee, and allow other dealers (members) to access the quotations in order to complete an OTC trade in a manner that is independent of the bulletin board service. As such, these OTC bulletin boards are not operating to match, clear or settle the transactions of the subscribing members. The bulletin boards therefore fall under a different regulatory classification than do exchanges that satisfy the criteria laid down by the Commodity Futures Modernization Act of 2000 or The Commodity Exchange Act, by performing centralized order management and order matching services leading to clearing and settlement.

In 1973, the Chicago Board Options Exchange (CBOE) was formed to facilitate the trading of standardized equity options in a non-OTC environment. The exchange created options with standardized strike prices, a standard number of shares per contract, and standard expiration dates, which left only the option price (premium) to be negotiated on the open market. The Options Clearing Corporation (OCC), also formed in 1973, acts as counter party to both buyer and seller in all exchange-based, non-OTC options trading. The current U.S. equity options exchanges own an interest in the OCC and benefit from the guarantee it provides for daily transactions between anonymous counterparts and subsequent contract fulfillment upon exercise.

Although there may be minor differences in some procedures on each of the exchanges, they are beginning to take advantage of electronic methods of trading to reduce their reliance on a method of floor trading known as "open outcry." In "open outcry" marketplaces, trading takes place through the use of hand signals and oral communication between market professionals at a central location referred to as a "pit"

in open view of other market professionals. In the pit-based system, an order is typically relayed to a trader standing in a "pit" by a booth broker who solicits options business directly from clients standing in a booth on the trading floor. Once the pit trader has received an order from his booth broker he makes the order known to the pit crowd and waits until another trader (or traders) shouts back a two-sided bid and offer market (the prices at which they are willing to buy and sell a particular number of option contracts). Then if the terms of the pit bid and offer are acceptable, a trade may occur.

All option markets, floor-based and electronic, rely on the skills of market professionals, known as specialists or market makers, who are responsible for maintaining an orderly market and providing liquidity through the publishing of bid and offer spreads. In floor-based markets, specialists can buy and sell on behalf of customers for orders that cannot be immediately processed, such as limit or stop orders, or they can buy and sell for their own account, which, in turn, provides liquidity in the market. Electronic markets divide these functions into two distinct roles, one being the market maker who provides liquidity through quoting and the other being the exchange administered limit order book that keeps track of limit, stop and other unfilled orders.

Market makers fulfill their responsibility for providing liquidity by ensuring that there is a two-sided market by publishing quotes electronically or calling out prices (quotations) at which they are both willing to buy (bid) and sell (offer) a particular option contract in the open outcry pit. Market makers honor their quotations when trading with incoming orders. In the traditional open outcry system, market makers call out these quotations throughout the trading day and, in addition, when orders are routed into the trading pit.

Over time, each of the existing option exchanges has developed systems to track and publish the best price quotation for each of their traded products. In the case of open outcry markets, market makers call out quotations that are manually entered into a tracking system by an exchange official. The system tracks and displays the best bid and best offer, as well as the market depth, for the prices quoted in the trading pit at any given time. In their existing state, these quotation systems do not identify the best quotation currently displayed or the number of contracts (size) for which the market maker is willing to trade. In some cases these systems simply display a single quotation for the entire pit that is valid (firm) for only smaller-sized orders, for example 10 contracts, and for only certain types of orders, for example public customer orders entered on an exchange for immediate execution at the existing market price (the best bid or offer). Such customer-entered orders are known as "market orders."

Some floor-based exchanges have procedures for the automatic execution and allocation of these smaller-sized public customer market orders at the displayed quotations through a rotation assignment of the orders among the pit market makers known, for example, at the CBOE as the RAES "wheel."

Execution through the use of RAES and the displayed quotation and automatic allocation to market makers does not provide a guaranteed market for incoming smaller-sized public customer market orders unless the incoming orders reflect the best bid or offer in the market at the time. The rotation system is a 'value added' for the market maker who is able to count on a dependable level of retail business all throughout the trading day. CBOE market makers providing quotes on RAES also quote prices in the pits.

When a limit order cannot be filled immediately, either because the current bid or offer quotation is outside the market or because there is inadequate size to fill the order at the volume ordered, the order is placed into a "limit order book". A limit order book is a record of outstanding current public customer limit orders that may be matched against future incoming orders. At the existing option exchanges, these limit books may be maintained in a manual and/or electronic format.

Beyond the trading processes internal to each option exchange, additional considerations arise when an option is listed on multiple exchanges. In order to assure that an order in a multiply-listed contract receives the best execution price, market professionals at an originating exchange are charged with the responsibility of checking the other exchanges' quotations for prices better than the originating exchange's best bid or best offer and with the responsibility of contacting the other exchange to verify that the quotations are valid. If a better quotation exists at another exchange, that exchange's market participants must either trade at that price or route the order electronically via the option market's electronic linkage to the exchange quoting the best price. The incoming order into a non-electronic exchange is generally not automatically processed and must be addressed on a case-by-case basis. The increasing volume of trades in option contracts, as well as the speed at which underlying price information is transmitted to consumers, has increased the demand for faster trade execution in today's market.

Computer-based exchange systems have been used for a number of years to manage a central limit order book, match orders and record fills in all forms of commodities, stocks and options. In an electronic exchange environment prices in options are relayed electronically to customer sites where computer workstations now house front-end trading software that enables market professionals to manage orders in commodities, securities, securities options, futures contracts and futures options among other instruments. Within the front-end trading system environment at the client side is a range of functionality that enables a customer to selectively display his own order information to send orders directly to the exchange back end, and to receive information relating to filled orders from the exchange.

Since 1973, apart from the Chicago Board Options Exchange, eight other exchanges have offered standardized equity options trading. These are the American Stock Exchange (AMEX), the NASDAQ, the New York Stock Exchange (NYSE), the Pacific Stock Exchange (PSE), the Mid West Stock Exchange (Chicago Stock Exchange), the International Securities Exchange (ISE), the Boston Options Exchange (BOX) and the Philadelphia Stock Exchange (PHLX). All these exchanges list options with standard strikes, standard numbers of shares per contract and standard expiration dates. On May 26, 2000, the International Securities Exchange (ISE) formed the first fully electronic U.S. options exchange followed by the Boston Options Exchange (BOX) on Feb. 6, 2004. Since their inauguration, the ISE and BOX have positioned themselves as electronic competitors to the conventional open outcry option exchanges and, combined, have quickly grown to surpass the trading volume of the CBOE for equity stock options.

Option contracts have also been used to give incentives to employees of companies. For many years, publicly owned companies have provided payment to upper level executives in the form of options to purchase shares of stock in the company for whom they were employed at discounts from the prevailing market price. These stock options are attractive for many reasons. For one, the option is a form of deferred payment that provides certain tax benefits and allows the individual to control the times during which the income is derived. In addition, the opportunity to buy stock in the company is an additional incentive to the option recipient to work to increase the value of the company, and so also the value of the stock options.

Early forms of option plans were limited in scope and available only to a handful of key executives. Indeed, the use of options as a form of compensation was routinely limited to the officers of a corporation, while the remaining employees were either granted stock pursuant to pension plans or, more often than not, were unable to participate in company sponsored ownership. As alternative forms of compensation grew in popularity, companies were increasingly interested in providing payment to select employees in untraditional forms. Concepts such as flex time, position sharing, benefit tailoring, and others became the terminology of personnel departments for mechanisms to address staffing needs in a cost efficient manner.

More recently, companies are examining the possible broader use of stock option-based compensation to cover greater numbers of employees in order to stretch out staffing dollars and to provide remuneration to employees in a form particularly desired by many staff members. Although greeted with substantial enthusiasm, the problems in implementing a company sponsored stock option plan are daunting. As the number of participants grows, tracking salient data becomes increasingly complex. For the most part, companies are not equipped to handle the transactional attributes of stock option processing on a scale above a handful of participants. Each of the options (or each block of options) for each grant to each participant in the plan must be individually tracked for proper delineation of such parameters as the granting, vesting, exercise, and expiration dates, and the particular strike price for which the option right was granted. Also, the practical exercise of an option requires the use of a brokerage house and an established exchange for trading and consummating the options and the underlying security in accordance with the plan attributes.

The complexities of option account processing increase disproportionately when more than one company is involved; this is especially true for multinational companies working within the borders of multiple countries, each with its own set of legal requirements on stock ownership and tax consequences for resident employees. Heretofore, there has been an absence of processing capabilities available to address the management of a multi-country, multi-company stock option account compensation plan for a plurality of individual accounts. In addition, stock option plans for multinational corporations, or for multinational employees (i.e., employees who work for one or more companies in two or more countries), have the added practical problem of exercising options where the underlying security and the funds are in different currencies.

Besides currency differences, from the participant's point of view there can be significant uncertainties over how to exercise options because options may be granted in qualified (i.e., qualifying for preferential tax treatment) or non-qualified plans, and the option may be exercised so that the participant receives the underlying security, a cash disbursement representing essentially (less taxes, commissions, and fees) the difference between the strike price and the then present market price of the underlying security, or some combination thereof. It would be beneficial to the participant if he or she could simulate various financial outcomes (e.g., including estimated taxes, fees, or cash disbursements, or combinations thereof) to arrive at what is best for the participants' financial needs precipitating exercise of the options.

In 1973, the Black-Scholes pricing model for exchange-traded options was published by Myron Scholes and Fisher Black. Using the Black-Scholes model, the price of a call option can be expressed using the following formula:

$$C = PN(d_1) - Xe^{-rt}N(d_2)$$

$$d_1 = \frac{\ln\left(\frac{P}{X}\right) + \left(r + \frac{s^2}{2}\right)t}{s\sqrt{t}}$$

$$d_2 = d_1 - s\sqrt{t}$$

Where:
C=the price for the call option
P=the current price of the underlying security
X=the exercise price for the option
r=the risk free interest rate
s=standard deviation of the underlying returns
t=time left until the option expires
N( )=cumulative standard normal distribution
$d_1$ and $d_2$=the normalization factors of the option This formula was the first theoretical model for calculating the fair value of a call option, and Black and Scholes were awarded the 1997 Nobel Prize in Economics over twenty years after the model was first published. Today the Black-Scholes formula is in use daily by thousands of traders to value option contracts traded in markets around the world.

The Black-Scholes pricing formula, along with other theoretical option pricing models, calculates the fair value of an option in part by assuming that fair value will be the price someone would pay in order to break even in the long run. The model employs several parameters that can affect the value of an option, the most important of which are the price difference between the underlying instrument and the strike price of the option, the volatility of the underlying instrument's return, and the time to expiration of the option.

There are many variations of the standard "vanilla" call option that the Black-Scholes pricing model is based on. Some of the more interesting and important ones are listed below:

Forward-Start Option. An option that starts proportionally in or out of the money after a known elapsed time in the future.

Option on Option. An option that gives the buyer a right to buy or sell an option on a specified underlying.

Accrual Option. An option that gives the buyer the right to receive a payoff for each day the underlying exceeds the strike price of the option.

Extendible Option. An option that may be exercised at its original expiry date but can also be extended at the holder's discretion. The strike price may also be adjusted at the time of the extension.

Analytic Spread Option. An option on a spread (or difference) between two different underlying instruments.

Barrier Option. An option that depends on whether the price of the underlying instrument has reached or exceeded a certain price.

Partial Start Barrier Option. The location of the monitoring period of the option starting at the starting date and ending at an arbitrary date before the expiration of the option.

Chooser Option. Gives the buyer the right to choose whether the option is to be a call or a put at the decision time of the option.

Cash Settled Option. A standard option except that the payoff is in cash by the amount the option is in the money at expiration. The buyer does not need to 'buy' the underlying security.

Fixed Strike Lookback Option. At expiration the option pays out the maximum of the difference between the highest observed price in the life of the option and the strike price.

Floating Strike Lookback Option. Gives the holder of the option the right to buy the underlying security at the lowest price observed in the lifetime of the option.

Binary Option. An option on whether an event occurs or does not occur, at expiration, settled for either a fixed price or worthless if the event does not occur.

The Chicago Board Options Exchange started offering flexible exchange options (FLEX options) as a type of tradable derivative in 1993. With FLEX options the user can select customizable contract terms, and once a custom contract has been selected and there is open interest in that contract, the exchange will continue to trade contracts with those identical terms as a series until the expiration time of the custom option. With FLEX options, the terms of the contract that can be customized are the contract type (calls or puts), expiration date (with certain exceptions), exercise style (American or European), exercise price and contract size. When a user selects a new custom contract, a Request for Quote (RFQ) is entered into the system and market makers will respond with a quote for that contract. Once there is open interest in a certain contract, that contract will be traded until expiration of the option, with certain limits on contract sizes. FLEX options give the user the advantage of customizable terms and an available secondary market for resale of purchased options to close out positions before expiration.

Combinations of economic transactions using options can sometimes result in interesting positions in the underlying market. For example, a bull call spread is a well-known option combination that involves buying a call option and selling a call option with a higher strike price where both activities have the same expiration date. This combination of events has the effect of limiting gain and loss if the underlying stock or commodity moves a large amount from its original price at the time the spread was created. However, the open spread position will still be moderately profitable with a moderate price gain in the underlying security. A bear call spread is the opposite of a bull call spread, where the call that is sold has the same expiration date but a strike price lower than the call that is bought. The net effect is the same, except the position is profitable in the case of a limited price drop instead of a price gain.

Another type of option combination is a time spread (or calendar spread). A time call spread is similar to the bull call spread or the bear call spread in that calls are both bought and sold, but the options that are bought and sold in this case have the same strike price but differing expiration dates. A long time call spread is entered by purchasing a call and selling a call with the same strike price but different expiration dates. The short option will expire first, and it is at this expiration time where the position typically has its highest value. It can be noted that although call spreads were discussed here, similar effects can be had using puts instead of calls, and the strategies do not differ substantially with the exception of the direction of profitability with underlying price movement.

Another type of option position is the synthetic long or the synthetic short position. A synthetic long position is created by buying a call of a particular strike price and expiration, and simultaneously selling a put with the same strike and expiration. The profit/loss effect of this trade with respect to the underlying good's or security's price movement is the same as buying the underlying instrument—there is no difference, aside from the price of the position, to simply owning the underlying security. This can be seen by considering the following: if the synthetic long position is entered with a strike price of 30, and if the underlying price moves above 30, the trader will want to exercise the call to buy the underlying instrument at the strike price. Conversely, if the underlying price moves below 30, the call becomes worthless, but the buyer of the put (on the other side of the trade) will undoubtedly want to exercise the put, which obligates the trader to buy at the strike price of 30. In either case, once the options expire, the trader ends up buying the underlying instrument at the strike price for a synthetic long position, or selling the underlying instrument at the strike price for a synthetic short position.

In both the synthetic long position and the synthetic short position, it is rare for the underlying security to trade exactly at the strike price when the option position is purchased, and as a result the premium for the option bought will usually differ, sometimes substantially, from the premium for the option sold. This means that although the premiums may largely cancel each other out (premium sold canceling premium bought in terms of cash out-of-pocket), there may be a residual debit or credit to the trader's brokerage account due to the inequality. In addition, arbitrage opportunity may be present if the difference in premium for the options plus the strike price does not equal the price of the underlying instrument.

There are many other types of options positions that can be entered into, some involving a combination of different options. The various types of position that can be created are too numerous to cover individually, but it should be noted that each position has its own risk/reward profile and profit/loss expectancy. Depending on the trader's perception of the market and the price behavior of the underlying security, an appropriate option strategy can be selected, enabling the trader to customize his option portfolio according to his needs. This flexibility creates an important advantage in the trading of options as opposed to directly buying or selling combinations of the underlying instrument.

Option traders sometimes refer to a mathematical way of defining option contract properties as determining "the Greeks." There are five important "Greek" values that are well known in the industry; the Delta, the Vega, the Theta, the Rho and the Gamma. The delta of an open option position is the amount that the option's price will change in accordance with a one-point change in the price of the underlying. Vega is a measure of the option's sensitivity to volatility. Theta gives the sensitivity to time-to-expiration. Rho and gamma give the option price sensitivity to interest rates and the amount of change in the delta for a small change in the underlying instrument, respectively. Each of these parameters is a measure of the sensitivity of the option's price to changes in the underlying instrument. Each is an important measure of option price sensitivity.

Futures contracts, like option contracts, also have an underlying security, commodity, good or service. The buyer of a futures contract agrees to accept delivery of the underlying on the expiration date of the contract, and the seller of the futures contract agrees to deliver the underlying at expiration. Futures contracts, unlike their underlying instruments that have limited availability, can be infinitely replicated with opposing positions having the effect of canceling and negating each other. Unlike option contracts, futures contracts do not have a strike price and as such, the value of a futures contract will typically be formed on the basis difference to the price of the underlying instrument.

Forward contracts on an underlying instrument are contracts that mature at a certain date and time but for which settlement (the actual transfer of ownership of the underlying instrument) takes place at a separate and distinct time in the future. Forward contracts do not have the same flexibility as futures contracts and are not readily transferable in a secondary market. They often represent a transaction effected between two consenting counter parties as a bilateral trade. They are considered to be "over the counter" (OTC) in nature and are not bound by the standardized conditions of exchange traded futures or options.

Contracts for differences (CFD), traded in the UK, allow traders to "buy" a security at its current price, and when the contract is sold, the difference in price is cash settled. Traders may choose how much they wish to pay, i.e., there is no actual transfer of assets involved. A broker will typically offer a point spread and a trader will "buy" at the higher value, the "ask", and "sell" at the lower value, the "bid." The process is very similar to financial spread betting, also available in the UK. The main difference between CFDs and financial spread betting is the tax treatment preference given to CFDs. The advantages of a CFD are that market participants can choose their buy-in price, and they provide a leveraged investment vehicle. The disadvantages of CFDs include potentially losing much more that was risked.

SUMMARY OF THE INVENTION

The presently described technology relates to inventions concerning systems, methods and apparatus enabling short-term options to be traded, enabling traders to take advantage of price movements in an underlying instrument. The system offers high leverage short-term trading opportunities that involve options and option combinations. The described technology achieves this by utilizing a unique method of standardizing the qualities of an option contract. Instead of using standardized option contracts with fixed strike prices and fixed expiration dates, the described technology standardizes options based on relative times and relative prices. An implied underlying price is then derived from any available option prices that, in turn, can be used to replace prices in underlying assets generated by external institutions and methods. The described technology creates a self-contained option marketplace that can exist and operate independently of other markets.

BRIEF DESCRIPTION OF DIAGRAMS

DETAILED DESCRIPTION OF THE INVENTION

Definition of Terms

Figure 1:
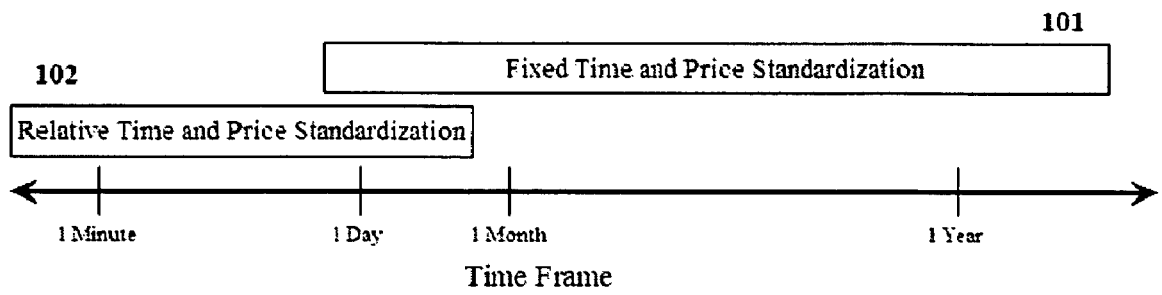
FIG. 1 shows how options traded using the system of the invention are intended for use with shorter time frames than current technology addresses, with certain overlapping time frames where either method could be utilized.

Certain terms are defined within the field of practice described herein, and these terms should be readily understood.

Option Contract—An option contract is a contract that conveys to its holder the right to buy or sell shares of an underlying good, service, security, commodity, market index, or other purchasable item at a specified price on or before a given date. The seller of the option contract grants this right to the buyer of the option contract.

Underlying—Every option contract has a good, service, security, commodity, market index, other derivative or other purchasable or saleable item that the purchaser of the option gains the right to buy at the strike price of the option if he or she owns a call, or to sell at the strike price of he or she owns a put. The item that is purchased or sold upon expiration or exercise is referred to as the option's "underlying", or alternatively, its "underlying good" or "underlying instrument".

Premium—The price or value assigned to an option contract by trading counter parties, through negotiation or other mechanism.

Call—A type of option granting the buyer the right, but not the obligation, to buy the underlying instrument at the strike price of the option either at the expiry date of the option or before. Buying a call is similar to taking a long position in the underlying instrument although it has a different risk/reward profile.

Put—A type of option granting the buyer the right, but not the obligation, to sell the underlying instrument at the strike price of the option either at the expiry date of the option or before. Buying a put is similar to taking a short position in the underlying instrument although it has a different risk/reward profile.

Strike Price—The strike price of a call option is the price at which, upon exercise or expiry, the seller agrees to deliver the underlying instrument to the buyer. The strike price of a put option is the price at which, upon exercise or expiry, the seller agrees to take delivery of the underlying instrument from the buyer.

Expiration—Every option has an expiration date, beyond which, the contract to buy or sell the underlying instrument is no longer valid for the buyer of the option and no longer binding upon the seller of the option.

Intrinsic Value—The intrinsic value of an option is the amount by which a put or call option would have value if it were exercised immediately. If the current price of an underlying instrument is greater than the strike price of a call, or less than the strike price of a put, then the positive difference of these two amounts is the intrinsic value of the option. The option in this case is said to be in-the-money, because it can be exercised immediately for a profit. If the current price of the underlying instrument is less than the strike price for a call, or greater than the strike price for a put, the option is out-of-the-money and has no intrinsic value. Intrinsic value is always zero or greater, never negative.

Time Value—Time value is the price difference of the premium of an option minus the intrinsic value of the option.

Out-of-the-money options with time left until expiration can still have a time value, because there is a chance that an option with no current intrinsic value could still become intrinsically valuable by expiration. The time value of an option is the market's best estimate of a price that is representative of the probability that an option will expire "in-the-money", and by how much.

Volatility—Volatility is a measure of how rapidly the price of a security, commodity, or other instrument is likely to change over a certain time period. A stock with higher volatility is associated with either the fact of, or the perception of, large, rapid price changes while a stock with lower volatility is associated with either the fact of or the perception of, smaller, less rapid price fluctuations.

Random Walk—An economic theory that states that short-term price volatility is a result of independent, apparently unrelated or even random buy orders and sell orders in the marketplace, as opposed to market changes which occur in the long term that are the result of fundamentals, such as corporate profit/loss statements, balance sheets and statistics like earnings-per-share.

Relevance—An option is said to be relevant if there is a reasonable probability that the option will expire with intrinsic value at expiration. Relevant options are those that have intrinsic value now, or that have a high enough probability of having intrinsic value at expiration for the market to assign them a time value component.

Leverage—Leverage is the name given to the practice whereby market participants increase their exposure to potential market and underlying instrument price movements by buying derivatives. For example, standardized derivative contract sizes of 100 shares per contract may cost a fraction of the price of buying the equivalent number of underlying securities but in turn, they create a much higher yield should the transaction become profitable. A highly leveraged investment is one that may return a proportionally larger profit for a smaller amount invested. A low leveraged investment is one that may only return a smaller profit over time.

Relative Time/Price Option Standardization

To appreciate the presently described technology and inventions included therein, the present system of trading options must be considered. The existing system for trading options on an exchange involves the concept of standardization. Standardization in the prior art refers to the setting of discrete calendar time and price intervals for the expiration date and strike price for option contracts listed on the exchange. One of the primary reasons for standardization is to concentrate trading in standard option contracts in order to increase liquidity. A second reason for the current method of standardization is to guarantee a marketplace where there is a way to close out open positions by selling back an option that was previously purchased. Other reasons for standardizing option contracts on an exchange include advantages offered by price transparency, price discovery and dissemination (market participants are able to see what prices are available in the market to a certain level of market depth and the prices of previous transactions) and price competition (the best price in the market will be traded first).

It should be understood that the terms "exchange" and "marketplace" or "market" can be used interchangeably within the scope of this discussion, and that the term "exchange" can be readily interchanged and be substituted in place with the term "marketplace" or "market" in this document, when referring to the context of the system of the described technology that underlies inventions claimed herein. Using the term "exchange" in this document in the context of the system of the described technology should therefore be understood not to limit the scope of the system of the invention as to be pertaining or applying to only entities adhering to the strict definition of an exchange as defined in various securities or commodities laws, for example.

In addition, while the terms "security", "commodity", "instrument", or "good" may be used in this discussion at times for the underlying of an option contract, this should not be interpreted to limit the scope of the application of the systems, methods and apparatus of the invention. Option contracts with underlyings that are securities, commodities, futures, market indices, currency pairs, exchange rates, other derivatives or other goods or services will work equally well with the systems, methods and apparatus of the invention. In the scope of this discussion it should therefore be understood that underlyings, or underlying goods or instruments, for option contracts may be any good, service, security, commodity, market index, derivative or other purchasable or tradable item of value or other asset.

With the prior art systems for trading options on an exchange, once a specific underlying (stock, security, commodity, etc.) is selected for the trade, a purchaser will be able to access a list of available options. For options on stocks, these options would ordinarily be defined by a termination date, whether the option is for a Call (option to buy the underlying at the strike) or a Put (option to sell the underlying at the strike) and a bid/ask price spread associated with each particular option. Options may be of more interest to market participants when they are relevant, that is, with strike prices close to the price of the underlying instrument. For example, a list of available options for IBM when IBM is trading at $90/share might appear in a table format such as the table below.

| IBM Calls Expiration/Strike | IBM Puts Expiration/Strike |
|---|---|
| November $85 | November $85 |
| November $90 | November $90 |
| November $95 | November $95 |
| December $85 | December $85 |
| December $90 | December $90 |
| December $95 | December $95 |
| January $85 | January $85 |
| January $90 | January $90 |
| January $95 | January $95 |

Because of option contract standardization regarding specific expiration times and strike prices, there may be multiple traders competing in the marketplace for order execution, in the form of competitive bid and ask price quotations posted to the marketplace. The market therefore believes that these bid and ask prices are efficiently priced because the bid/ask spread is the result of multiple traders or market makers expressing the best price (maximum buy price and minimum sell price) they are willing to execute a deal at for the particular option contract at that time.

An alternative to the auction (bid/ask) exchange described above is the manner in which options are traded on the over-the-counter (OTC) market. These markets enable buyers of options to customize option trades they would like to execute by defining the parameters of the trade, such as the expiration date of the option and the strike price. These parameters are then floated in the market, and other traders or market makers are able to assess whether they want to transact at (or negotiate) the trade parameters stated. The OTC market does not match multiple buyers and sellers, as each trade is likely to be unique, with a single buyer and a single seller at the stated parameters for each trade. OTC markets also do not offer a reasonable guarantee that each party (buyer or seller) is getting the best price possible (price competition), because each trade is unique to the counter parties engaging in it and there are no other similar trades to compare it to. OTC option trades are created between two counter parties and are usually anonymous to the rest of the marketplace. This means that other market participants are not privy to the specifics of the trade and therefore cannot benefit from that knowledge (price discovery).

The presently described technology and the inventions included therein address an inadequately addressed need in the financial markets, that is, the need for a low cost, low risk, high leverage method for profiting from price movements of underlyings, as for a security, commodity, goods or other asset, over a very short time frame. This need can be fulfilled effectively by using option contracts with a very short duration, called short-term, or micro-option contracts. The term "short-term" in the context of the present invention refers to (but is not necessarily limited to) option contracts with a time from purchase to expiration of less than one day, and in most cases time within a single working day, such as much less than one day, for example down to one hour or even 15 minutes or less. Intervals of 24 hours, 12 hours, 10 hours, 9 hours, 8 hours, 7 hours, 6 hours . . . 5, 4, 3, 2, 1, etc. would be examples of specific time ranges for options. The options may also be specific for active trading hours (e.g., 15 minutes would run from 3:59 p.m. of a first day to 9:14 a.m. of the next day, assuming the market to open at 9:00 a.m. and close at 4:00 p.m., or the time may be based upon newer extended market or exchange times.

Options with such short life spans may be inexpensive and create a price effective solution for market participants to engage in short term leverage. As an example using stock options, if a stock is trading at $30.00 and a trader expects the price to go up in the next hour, he or she might buy 100 shares of the stock for $3000.00. In contrast, if there is a call option contract available on the stock that expires in an hour with a strike price very close to the current price of the stock, the same trader would be able to buy the option for a much reduced premium or price, for example, possibly in the region of $10.00, depending on the volatility of the underlying stock. In this example, the cash out-of-pocket required to enter the option position is much less than for the underlying position, with both positions achieving the same profit potential in the case of a price increase in the underlying security. However, the option premium in the example (the $10.00) is the most the trader will lose if the market moves against the position and the underlying security price falls.

Aside from their lower cost, short-term micro-options also reduce risk to traders in a different manner. It is well known that profitability while using trading systems results from many factors; one of the most important is the reduction of risk while performing a transaction or trade. With a shorter duration option, there is less uncertainty in future price movement over the life of the option because the 'random walk' in terms of price volatility caused by the interactions of market participants over shorter time durations is more predictable (less variation potential) than over longer time durations. This factor weighs in favor of using a shorter-term option over a longer one for short-term benefit in order to increase potential returns in certain trading strategies.

It should be understood that the cost of taking a long position in short-dated options as described by the system of the invention may or may not be cheaper than taking a position in a conventional standardized exchange-traded option given certain circumstances not excluding events that create sudden price volatility. Options of various designs including those created by the system of the invention are subject to variable premiums depending on the circumstances affecting the market in which they are bought or sold. Owing to the short-term lifespan of an option of the invention, however, the monetary outlay required to purchase a long position in puts or calls may be less than the premium required to purchase a long position in puts and calls of traditional exchange-traded design.

There is supporting evidence in the financial industry of the desirability of short dated micro-option contracts. Established option exchanges are moving toward trading options with finer expirations along with closer strike prices. This closely parallels the recent move in the securities markets towards decimalization, which transitioned from trading in ⅛ths and 1/16ths to pennies and even less recently. In addition, there has been a significant implosion in trade transaction times. The reduction in the time taken to price and execute trades reflects the evolving mechanics of the marketplace and creates the need for more flexible products with short evaluation, transaction and lifespan cycles. The marketplace needs to be able to exercise the opportunities provided by the move toward real-time electronic trading systems to transact trades in shorter lifespan products. Clearly the industry desires and would benefit from greater granularity, which can only be achieved in prior-art systems through the use of finely spaced expiration times and strike prices.

The following example illustrates one reason that short-term micro-options are not presently available for exchange trading, or any other form of standardized contract trading. Assuming that the option contracts are standardized with fixed expiration times and fixed strike prices using the current method of exchange standardization, a table listing available micro-options for the same IBM stock trading at $90 in the above example might resemble the following listings:

| IBM Calls Expiration/Strike | | IBM Puts Expiration/Strike | |
| --- | --- | --- | --- |
| 10:25 a.m. $89.90 | 10:35 a.m. $89.90 | 10:25 a.m. $89.90 | 10:35 a.m. $89.90 |
| 10:25 a.m. $90.00 | 10:35 a.m. $90.00 | 10:25 a.m. $90.00 | 10:35 a.m. $90.00 |
| 10:25 a.m. $90.10 | 10:35 a.m. $90.10 | 10:25 a.m. $90.10 | 10:35 a.m. $90.10 |
| 10:25 a.m. $90.20 | 10:35 a.m. $90.20 | 10:25 a.m. $90.20 | 10:35 a.m. $90.20 |
| 10:30 a.m. $89.90 | 10:40 a.m. $89.90 | 10:30 a.m. $89.90 | 10:40 a.m. $89.90 |
| 10:30 a.m. $90.00 | 10:40 a.m. $90.00 | 10:30 a.m. $90.00 | 10:40 a.m. $90.00 |
| 10:30 a.m. $90.10 | 10:40 a.m. $90.10 | 10:30 a.m. $90.10 | 10:40 a.m. $90.10 |
| 10:30 a.m. $90.20 | 10:40 a.m. $90.20 | 10:30 a.m. $90.20 | 10:40 a.m. $90.20 |

This table is, of course, an abbreviation of the full range of options that would be provided and covers only $0.30 cents in strike prices and only 15-minutes of time. For any particular trading day, there could be thousands of different options to choose from when the present method for standardization is used, where the 5-minute intervals chosen for the example above being one of a number of convenient formats for defining the time frame for the expiration of the traded options. This format is quite complicated, provides excessive numbers of variations, and does not allow efficient trading because there are too many choices for market participants. As a result, matching buyers and sellers for a given transaction may not be possible.

Because there are so many potential choices for trading given the above scenario, each individual option offer or bid is likely to experience limited trading activity. As a result, there is no guarantee that a trader will get the best market price for an option because there may be no price competition on bid or ask (offers) for a particular contract at that particular time. Another problem associated with low liquidity and less competition between market participants is there will typically be a large bid/ask spread for each listing. Such a situation also indicates that a market may not be offering competitive pricing, which is undesirable in any trading system, marketplace, or exchange because it naturally increases transaction costs.

The systems, methods and apparatus of the present disclosure include inventions that can solve the 'liquidity of trading' problem for short-term micro-options by reducing the number of choices available for trading. This is done in a novel way by offering issues based on time duration instead of fixed expiration times. Additionally, in order to guarantee the relevance of the strike price at any given time, the issues have floating strike prices, specified using a fixed amount either above or below the current price of the underlying instrument. A floating strike price as used in this description is specified using absolute monetary amounts, as a percentage of the underlying price, or other similar method, which may include relative and floating values. Both methods specify the delta, or price difference, of the strike price relative to the price of the underlying instrument. As the underlying instrument varies in price, the floating strike price of the option does not change, and will continue to specify a fixed amount in relation to the current underlying price. By comparison, a table listing the available options for the same IBM stock trading at $90 used in the examples above might look like the following table, which lists all the contracts that might be offered on a particular day, using time durations and floating strikes specified with fixed dollar amounts as the format for the listings in the table below:

| IBM Calls<br>Duration/Floating Strike | IBM Puts<br>Duration/Floating Strike |
|---|---|
| 15 minute/−$0.05 | 15 minute/−$0.05 |
| 15 minute/+$0.00 | 15 minute/+$0.00 |
| 15 minute/+$0.05 | 15 minute/+$0.05 |
| 30 minute/−$0.10 | 30 minute/−$0.10 |
| 30 minute/+$0.00 | 30 minute/+$0.00 |
| 30 minute/+$0.10 | 30 minute/+$0.10 |
| 1 hour/−$0.25 | 1 hour/−$0.25 |
| 1 hour/+$0.00 | 1 hour/+$0.00 |
| 1 hour/+$0.25 | 1 hour/+$0.25 |

The table lists options using time durations and floating strike prices. In one embodiment of the system of the invention, the time duration specifies the duration of the life of the option contract from the time of the trade and the floating strike price specifies the strike price of the option, relative to the price of the underlying instrument at the time of the trade. It is important to note that listing an option in this way does not fix the expiration time or the strike price of the option until the trade is undertaken. Both parameters will be assigned at a future time, which in one embodiment is the time of the trade. It is equally important to note, and will be shown below, that it is still possible to price an option contract specified by time duration and floating strike price without knowing the exact future strike price or the exact expiration time, as long as the volatility of the underlying security is known and is assumed to be predictable. Other embodiments of the system of the invention provide for assignment of the option parameters at any arbitrary future time as determined subsequent to the trade by one or both of the trade participants, the marketplace, or other suitable manner.

There are far fewer potential choices available for short-term options with this system as compared to prior art systems using fixed expirations and fixed strike prices. Each listed option in the example above has a bid/ask price associated with it, as well as a defined time duration and a defined floating strike price. The short-term options are therefore standardized, but use expiration times relative to a time of the trade (or any future arbitrary time) and prices relative to a price of the underlying instrument at a time of the trade (or any future arbitrary time). Using this system, the time of expiration of the option and the strike price for the option is not specified at the time the trade is undertaken.

As time progresses and the underlying security moves up or down in price, the bid and ask prices always refer to an option that will expire exactly 15 minutes from now and will have a strike price $0.05 above the current price of the security (using the 15 minute/+$0.05 Call listing as an example). In this way, the listed options are always relevant, that is, the strike prices are always close to the current price of the underlying security and the options will always have the same time-to-expiration no matter when they are purchased. This is different from the current option standardization system in use. With the current system, as the underlying instrument moves up or down in price, the option markets introduce additional strike prices for trading as the security moves outside of the range of strike prices currently trading.

As a specific example using the time of the trade to determine contract parameters, assume a buyer purchases a 1 hour/+$0.00 call, and the trade was completed at 9:32 a.m. If the security was trading at $90.13 at the time, the option contract would expire at 10:32 a.m. and the strike price would be $90.13. Similarly if a call's floating strike price was −$0.25 and the trade were made at the same time, the strike price would be $89.88. If a put were at +$0.25 and the trade was made at the same time, the strike price would be $90.38. If there were multiple offers in the same option class available, such as three puts at 1 hour/+$0.00, the strike price for each option could be different in a moving market over a period of time. For example, if the underlying stock moved from $90.13 at 9:32 a.m. at a rate of +$0.10 every 15 minutes, a trade executed on that option at 9:47 a.m., would still have a one hour expiry, but the strike price would now be $90.23, and a contract purchased from the same class executed at 10:02 a.m. would have a strike price of $90.33.

The procedure required for trading an option contract (or contracts) in this manner differs from prior art systems. Using the system of the invention, contract parameters (final expiration time, strike price) of the option are unknown or unspecified at the time at which a trade is undertaken. In prior art systems involving standardization, contract parameters are always assigned prior to the valuation or trading of the option. One type of option, known as a forward start option, allows for the assignment of the option strike price to be at-the-money at a predetermined future time in a manner bearing similarities to the system of the invention, however such options are typically used in employee stock plans in an over-the-counter manner and are not used in conjunction with standardized exchange-based trading to offer advantages of concentrated trading, price competition and price discovery to market participants. In addition such options involve fixed times, both for the time of the future strike price assignment and for the expiration of the option, further differentiating them from the system of the invention. At least one additional distinguishing difference therefore between various systems of the invention and the prior art is the act of assigning contract parameters of strike price and expiration time to a standardized option that has previously been valued, assigned a premium, or traded, something that does not occur in prior art systems.

Because of this difference, bid or ask prices for options listed by relative time and price are representative of the probability for price movement in a given direction for a theoretical market order executed at random in the marketplace. The act of buying (or selling) the option transforms the probability into an actual outcome by assigning the option's contract parameters at a time of the trade, or other future time as determined by market participants or the marketplace.

Every trade made using the system of the invention will result in an option contract that is likely to be unique (as pertaining to the option's contract parameters). It will be a relatively rare event for an option to trade on the system or market with the exact same expiration time and the exact same strike price as a prior trade. One consequence of this property is that a trader is unlikely to be able to sell back an option using the same system or exchange.

This is in stark contrast to the prior art systems of option standardization in use today. From the Option Clearing Corporation's well-known publication, *Characteristics and Risks of Standardized Options*, "Options having the same standardized terms are identical and comprise an options series. The standardization of terms makes it more likely that there will be a secondary market in which holders and writers of options can close out their positions by offsetting sales and purchases. By selling an option of the same series as the one he bought, or buying an option of the same series as the one he wrote, an investor can close out his position in that option at any time there is a functioning secondary options market in options of that series." In other words, prior art teaches that the standardization of options in use today uses fixed times and strike prices in part to allow the possibility that an option can be sold back to market participants on the same market from which it was purchased in order to enable the market participant to end in a flat or 'netted-out' position. Vice-versa for short positions that are bought back on the same market they were sold on.

The system of the invention seeks to retain certain advantages that a conventional option market exchange offers, which are: liquidity as a result of standardization, price transparency, price dissemination and price competition, but gives up the availability of a secondary market, associated with prior art conventional standardized option exchanges, in return for the ability to efficiently trade micro-option contracts with very short time durations. Therefore, in the context of the system of the invention, standardization consists of the presence of at least one of the following market characteristics: a) price competition, b) price discovery, or c) the grouping of options of similar characteristics in order to concentrate trading and promote liquidity; but does not require the presence of a secondary market to close out open positions as practiced with prior art. A standardized option in the context of the system of the invention is any option that receives the benefit of, contributes to, or is traded on the basis of at least one of the following market characteristics: a) price competition, b) price discovery, or c) concentrated trading of options with similar characteristics.

While the lack of opportunity to resell options into the same market would definitely be a drawback for trading options with time frames of weeks or months, it is not as big an issue for the proposed use of the current invention for two reasons: First, the system of the invention is intended primarily for use (but not limited to use) in the trading of short-term options with time from purchase to expiration of less than one day. With a short-term option, the degree of potential price swing or volatility of the underlying security during the life of the option is likely to be less than for an option with a life of several months, hence there is much less uncertainty until the option expires. This translates to expected lower risk and a reduced need for an open position to be closed out during the life of the option. Second, the overall premium or cost of a short-term option will likely be less than its longer-lived counterparts.

Traders transacting trades in short-term options may not be as concerned with the availability of a secondary market as they will be with having a relevant option available—one close to the current time and price of the underlying security. This tradeoff—guaranteeing the availability of a listed relevant option versus having a secondary market for closing positions—is another distinguishing feature of the system of the invention that makes it better suited for trading short-term options than the prior art.

This is not to say that there will be no method of nullifying a position with the present system of the invention. There are, in fact, several ways for a trader to nullify a position without selling back an option on a secondary market. A trader could buy the same type of option, put or call, (in this example a call option) at a new strike price and expiration time if they have an open short position and the underlying security price is moving adversely to the open position and creating a loss. The end result would be that the trader would be both long and short an option on the security at two different strikes, with the short position expiring first. This has the effect of negating the effect of further price changes that will increase the loss of the short position, while the long position might still have the potential for profit after the short position expires. This type of strategy is related to both the bear/bull spread and the time spread option strategy currently in use today on conventional markets and systems and has the effect of limiting position risk.

Another way for a trader to liquidate a position if it is a long (purchased option) position would be to simply exercise the option early if it is an American-type option and receive a cash settlement, or the underlying instrument be it another derivative or security. In terms of cash settlement, the amount of cash would relate to the price difference between the underlying instrument's price at exercise and the strike price of the option.

A third way to nullify the risk of a position, one that can be used with currently traded options also, is to simply buy the underlying stock or commodity (for a call that is sold short) or to sell the underlying stock or commodity (for a put that is sold short). This is known as "covering" a "naked" option position and is a commonly used technique in today's markets.

In the ways described above and alternatives and variations that would be understood to be included within the generic use of the described procedures with the full range of option techniques known to those skilled in the art, the systems, method and apparatus of the invention, while solving many problems for the trading of short-term options, may not be appropriate for trading longer-term options. The relatively recent advent of the electronic marketplace combined with the reduction of trade transaction times brings about the need for options with shorter life spans and therefore, a system such as the proposed system of the invention. In addition, market participants such as hedge funds and market makers who constantly seek to achieve a competitive edge in the markets will be drawn to new tools that give them the opportunity to fine-tune their performance and to quickly react to market conditions at a very low cost.

The diagram of FIG. 1 illustrates how, as the time frame for option contracts shrinks, the present method of standardization 101 using fixed times and fixed strike prices is adequate until the point in time where liquidity becomes an issue. At shorter option time life cycles the number of market participants transacting in a certain listed contract at a given time is unlikely to be enough to provide liquidity and subsequently, to supply the large number of different listing choices available for trading. Shrinking time frames, closely spaced expiration parameters and smaller strike price intervals causes a large number of options listings. Therefore, for short-term micro-options of one day or less, the system of the invention using relative time and price standardization 102 is much better suited for trading in a liquid manner. It is anticipated that the two methods of standardization are, in fact, complementary. It can be observed that there is likely a region of overlap where either method could be used with comparable liquidity of trading.

There are several other advantages in performing option transactions in the manner proposed by the systems, methods and apparatus described herein that include examples of the invention. The system offers a solution for trading short-term option contracts both efficiently and liquidly while offering the advantages of market transparency and price competition. Grouping contracts by specific prices and specific calendar times (rather than contract existence times) is far too limiting for short time durations and places a high sweat equity requirement on the traders to watch (and update) specific contract prices rather than merely relationships between contracts.

The current system of trading options with specific expirations can also cause strange behavior in the markets on a specific expiration day, as every near-term option approaches expiration at the same time. The proposed system would have options expiring at various or even random times and therefore minimizes the possibility of external and internal fraud or other manipulation of prices.

Another advantage briefly touched upon above is that the monetary outlay for a short-term option will be significantly lower than the monetary outlay for an option that has a life of a week or a month, which allows market participants to trade short-term options with less cash out-of-pocket. For example, a 1-hour option contract on 100 shares of stock might cost $5.00, which would significantly reduce the cost of entering a day trading play. The investment might be for $5.00 as against $9013.00 for 100 shares at $90.13 per share. The most the trader could lose on the trade is $5.00, as opposed to a potentially much larger amount if the trader fails to extricate himself (or herself) from the trade in time.

Another advantage is that complicated option play, such as straddles or strangles, is more easy to fine-tune because the options are exactly at the money instead of having to trade in contracts that are merely the closest to the desired option strategy. This approximation of costs in prior art practice versus the precise cost basis in the transactions of the present invention adds an undesirable and poorly controlled variability into options strategies. As the play on options is usually intended to be short-term and exercised with great precision, the use of precise values improves the opportunities available to the options trader. The use of these precise values and times from the point of contract execution also enables the system to be used with a variety of other types of securities and markets.

Extremely short time duration options can also provide a cost advantage to longer time duration options when entering into trades with multiple legs. This is due to the fact that if any one of the legs of the trade does not go through for any reason (a risk referred to as legging risk), the trader could elect not to exercise the options and instead could abandon the position entirely without incurring the expense of having to liquidate the position. The risk of having one or two legs of a strategy filled and one unfilled exposes the trader to position risk that could be avoided by utilizing the benefits of the invention. In order to take advantage of the flexibility provided by the invention, due to the fast expiration of the short time duration options, the trader would most likely benefit from using some type of automated trading software that would be able to react in a timely fashion in order to create rapid trade fulfillment.

One embodiment of the systems, methods and apparatus described herein that can be used according to practices of the invention is to allow traders to place option limit orders that are used to take advantage of event-driven price volatility in the market reflected in the price movement of the underlying security. For example, a trader might place a buy order for a 15-minute call on IBM at $91.00. This would mean that if the price of IBM rose to $91.00 or greater, a market order to buy the 15-minute call would be executed. The same situation but in the opposite direction would apply to puts. Note that the a such a buy order could apply to either buying a call or selling a put, both of which indicate bullish sentiment on the underlying security, and in the same way a sell order could apply to either buying a put or selling a call, both of which indicate a bearish sentiment on the underlying security.

Pricing Floating Options Standardized by Relative Time and Price

The Black-Scholes option pricing model used in pricing long-term options in the prior art can be simplified when pricing short-term options listed by time duration and floating strike price. The risk-free interest rate used in the formula does not have a large effect on the pricing of short-duration options. Additionally, the ratio of the strike price to the current stock price will always be a fixed, constant amount due to the way that these short-term options are traded. Thirdly, the time parameter is very small and remains constant until a trade has been undertaken.

In the context of options listed by time duration and floating strike price, therefore, the entire Black-Scholes formula reduces and simplifies to a form that depends primarily on the volatility of the underlying security.

Recall the Black-Scholes formula for a call option:

$$C = PN(d_1) - Xe^{-rt}N(d_2)$$

Where:

$$d_1 = \frac{\ln\left(\frac{P}{X}\right) + \left(r + \frac{s^2}{2}\right)t}{s\sqrt{t}}$$

$$d_2 = d_1 - s\sqrt{t}$$

C=the price for the call option
P=the current price of the underlying security
X=the exercise price for the option
r=the risk free interest rate
s=standard deviation of the underlying returns t=time left until the option expires N( )=cumulative standard normal distribution $d_1$ and $d_2$=the normalization factors of the option Now consider an option contract with fixed time duration and a floating strike price of 0 (meaning the strike price of the option will always be equal to the price of the underlying security). In this case, we can make the following assumptions:

1. P=X (strike price is always equal to the price of the underlying security)
2. P can be assumed constant over a very short time interval (we disregard small price changes)
3. the time parameter t approaches 0 (for short-term options), and that √t dominates over t itself as t becomes small
4. the parameter t is constant (for options standardized by time duration)

If we make these assumptions, the Black-Scholes formula effectively reduces to:

$$C \approx P \cdot [N(d_1) - N(d_2)]$$

where $$d_1 \approx \frac{s\sqrt{t}}{2} \text{ and } d_2 \approx \frac{-s\sqrt{t}}{2}$$

The parameters P and t are assumed to be constant for the reasons given above. Therefore, it can be seen that the price of a short-term call option is dependent primarily on the volatility of the underlying security, when the option is standardized by time duration and floating strike in the manner described here. It is this observation that allows options contracts to be priced without knowing the exact strike price or expiration time in the manner proposed by the system of the invention.

Note that the parameter s is dependent on the sampling interval. The Black-Scholes formula was derived using an annual volatility and time based on a one-year reference period, but the model can apply equally well to shorter time durations. This can be done for 5-minute time durations for example by calculating the standard deviation (volatility) parameter of the returns based on a 5-minute sampling interval. For an at-the-money call option of fixed time duration, using a standard deviation calculated from samples obtained at time intervals equal to the time duration of the option the time parameter then becomes equal to 1 and effectively drops out of the equation leaving:

$$C \approx P \cdot \left[N\left(\frac{s}{2}\right) - N\left(\frac{s}{2}\right)\right] = P \cdot \left[2N\left(\frac{s}{2}\right) - 1\right]$$

where:
C=the price for the short-term micro-call option
N( )=cumulative standard normal distribution
P=the average or mean price over the sample period.
s=the standard deviation of the returns over the sample period,
sampled at intervals equal to the option time duration.

When calculating the volatility in this manner, as with the original Black-Scholes model, sampled returns are used which can be gross returns, simple returns, log returns, or underlying returns as used by practitioners skilled in the field of option pricing.

An alternative method for pricing short-term options contracts can be shown using only direct statistical, observational techniques and without formulas, as in the following example. This table was generated using observed price changes in MSFT at 30-second intervals for a certain day:

| | | | | |
|---|---|---|---|---|
| $28.05 | $28.06 | $28.05 | $28.06 | $28.05 |
| $28.06 | $28.06 | $28.10 | $28.08 | $28.04 |
| $28.03 | $28.02 | $28.03 | $28.05 | $28.05 |
| $28.03 | $28.03 | $28.01 | $28.03 | $28.04 |
| $28.04 | $28.05 | $28.05 | $28.05 | $28.06 |
| $28.07 | $28.07 | $28.10 | $28.07 | $28.06 |
| $28.03 | $28.01 | $28.01 | $28.03 | $28.03 |
| $28.03 | $28.03 | $28.01 | $28.01 | $27.98 |
| $27.97 | $27.99 | $28.00 | $28.01 | $28.02 |
| $28.02 | $28.03 | $28.00 | $27.99 | $28.00 |
| $27.96 | $27.94 | $27.95 | $27.97 | $27.95 |
| $27.93 | $27.95 | $27.98 | $27.98 | $27.98 |

The data was entered as read from left to right, then top to bottom and accounts for 30 minutes of observations (60 samples spaced 30 seconds apart). The purpose for collecting the data in this way is to collect observational information on the expected variability of the price of the underlying security over very short time intervals. Prices collected in this manner can most likely be assumed to be randomly distributed as trades are placed in an apparently random manner by various independent market participants transacting in the marketplace. This assumption of random distribution of samples can be justified in the short-term because the marketplace is made up of many distinct participants, most of whom act independently in making trading decisions. Further, especially over the short-term, it is fair to assume that the timing of the individual trades will tend to distribute evenly. The Black-Scholes model itself makes a similar assumption, specifically that the underlying stock price follows a geometric Brownian motion.

The observed sampled data can now be reorganized according to price difference and then tabulated. The price difference between each sample and the sample immediately preceding it is calculated and grouped according to the price movement of the observed difference between samples. When this is done for the data collected above, the likeliness of a given price change over a 30 second interval (the data was collected with samples spaced 30 seconds apart), can be obtained and tabulated in the following format:

| 30 second price change | # of occurrences | Probability out of 60 samples | Call option profit per contract (100 shares) | Put option profit per contract (100 shares) |
|---|---|---|---|---|
| −$0.04 | 2 | 3.33% | $0.00 | $4.00 |
| −$0.03 | 4 | 6.67% | $0.00 | $3.00 |
| −$0.02 | 8 | 13.33% | $0.00 | $2.00 |
| −$0.01 | 7 | 11.67% | $0.00 | $1.00 |
| $0.00 | 16 | 26.67% | $0.00 | $0.00 |
| $0.01 | 14 | 23.33% | $1.00 | $0.00 |
| $0.02 | 6 | 10.00% | $2.00 | $0.00 |
| $0.03 | 2 | 3.33% | $3.00 | $0.00 |
| $0.04 | 1 | 1.66% | $4.00 | $0.00 |

From this, we can use simple probability and statistics to infer that a fair price for a floating call option over the time period that was sampled will be (14×$1.00+6×$2.00+2×$3.00+1×$4.00)/60=$0.60. Similarly, a fair price for a floating put option over the same time period would be (7×$1.00+8×$2.00+4×$3.00+2×$4.00)/60=$0.72.

If we assume that the stock will continue to trade with the same characteristics in the near future as it did during the observation period, we can price our short-term floating call and put options using these calculated values. In effect, using observational techniques, a sampled probability density function for the underlying security has been created rather than assuming a normal probability distribution, such as in the Black-Scholes formula. From the sampled probability function, each sample is weighted according to profit potential to arrive at what might be a more precise expectation of call and put fair values, assuming the underlying continues to behave with the same probability characteristics in the near future.

This simple example shows that it is possible to calculate a tailored, potentially more precise value for the fair price of a short-term option standardized by time duration and floating strike price using statistical observational methods as an alternative to the Black-Scholes or other theoretical mathematical models or formulas. A more complex pricing solution based on this technique might be used for real-time calculations using tick-by-tick standard deviations and volatility calculated using a computer or other data processing means on the fly to obtain a real-time price for the options.

While the description of the system of the invention was tailored to describe the operation as applied to a standard "vanilla" type option, is should be understood that by applying the principles described of listing an option on an exchange by time duration and floating strike prices, the same technique can be applied to any of the myriad of types of options that have been created or will be created in the future. It is the technique of relative time and price standardization and not the specific type or class of option that creates the novelty for the system of the invention.

A slight variation of the system of the invention provides for an option exchange or market that lists options by fixed time duration and fixed contract price, and where the bid/ask amounts are for the number of shares per contract or the amount in or out of the money instead of the premium. For example, using this variation, options might be listed as 15 minute/$5.00 options or 1 hour/$12.50 options, where the dollar amount is the total cost of the option, and never varies. A buyer of a 15-minute $5.00 option would pay $5.00 for the option no matter when the option was purchased. Traders would then make bids or asks (offers) based on the number of shares of the underlying security they are willing to include in the contract, or on the amount in or out of the money they are willing to set the option's strike price to in order to thereby increase or decrease the leverage of the position.

Deriving an Implied Underlying Strike Price

There are potential considerations in using the current price of the underlying security as the strike price for short-term options as described up to this point. The most important consideration to address is determining what exactly the current price of the underlying at a given point in time is. This can be difficult for many reasons. First, there may be multiple exchanges, market makers, or traders trading the same underlying security at the same time, each with slightly different prices. Some trades or quotations could be over-the-counter, meaning that the price at which the trade is transacted or the quotation made is not readily visible to all market participants. Second, delays in price transmission can cause the different market participants to have different, or slightly delayed, prices visible on their trading screen, even if the price information is coming from the same exchange or data source. Third, the degree of price differential or spread between the bid and the ask of the underlying security can at times be significant, causing the price of the last trade on an exchange to seesaw between the bid and ask price as market participants execute market orders in opposite directions. All of these issues could make it difficult or impractical to arrive upon an agreement for the exact price of the underlying that will satisfy all market participants.

To address this issue and remove any potential conflicts or problems, a different method can be used to set strike prices for short-term options as an alternative to using the last traded price of the underlying as the strike price. This method involves the use of a feedback mechanism between the market makers for the short-term options and the marketplace that is listing the short-term options. Using this alternative, the short-term options marketplace creates an arbitrary reference price for the underlying security that market participants agree will be the reference price for all options traded on the marketplace. All market participants agree that options traded on or using the marketplace will have a strike price based either directly or using an algorithm, mathematical formula, or method derived from or using this arbitrary reference price. For the purposes of simplicity, assume that the arbitrary reference price will be used directly as the strike price for all options traded. In one embodiment, cash settled options would also use this arbitrary reference price for the determination of option value at expiration. This arbitrary reference price will be referred to as an "implied underlying price."

The market makers quoting and trading options on the market will use this arbitrary reference and, ultimately, options strike price to obtain bid and ask prices for the short-term options, and in the normal process of trading will post their quotations on the market. The feedback mechanism comes in to play by continually adjusting the implied underlying price in such a way as to minimize the difference between the price of the calls listed on the market and the price of the puts listed on the market, for a given time duration. In other words, using this method, the implied underlying price is adjusted in order to achieve equal prices for puts and calls of the same time duration. It makes sense intuitively to observe that if the price of a 5-minute call with a given strike price is greater than the price of a 5-minute put with the same strike price, then the implied underlying price is less than the actual market price for the underlying security. In this case the implied underlying price would be raised until the 5-minute calls were once again trading at parity with the 5-minute puts. At this point the implied underlying price will be equal or at least very close to the actual market price of the underlying security, assuming short time durations where long-term interest rates and other factors such as market trends or significant events such as corporate earnings releases, etc., may not come into play.

The following steps can succinctly describe the feedback mechanism. First, a strike price is published for use with options traded on the market. Second, the market participants use this strike price to calculate prices for calls and puts. These prices are sent or posted to the marketplace for dissemination in the normal course of doing business. Third, the prices and quotes the various market participants post are observed, and the published strike price is adjusted in a prescribed manner to achieve the desired result, in this case, equality in prices between the calls and the puts on the marketplace. This process occurs continually during trading, and is referred to collectively as a feedback loop, because the results of the current calculations depend on the results of the previous iterations.

The feedback mechanism described above will automatically cause the implied underlying price to naturally gravitate towards the current market price of the underlying security, without any direct connection to any external exchange and without having to constantly monitor external data streams or use any complicated delay lines or other methods. This is due to the fact that the options that are traded on the market will require delivery into the underlying security or a future or forward based on the underlying security on expiration or exercise. By utilizing this method of feedback and the concept of an implied underlying price, the marketplace, not the market makers or traders, determines the implied underlying price and a fairly, efficiently priced market may see the implied underlying price become representative of the actual underlying price being traded on other markets. To see how this happens, consider the following description.

Assume that the actual external market price of the underlying security rises above the implied underlying reference price. The market participants, knowing that they will have to deliver the underlying security or a future or forward based on the underlying security if the option is exercised in the case of a call option, will then tend to over price the short-term call options and under price the short-term put options, which always have a strike at the implied underlying price. This difference between the call price and the put price can then be observed, and the implied underlying price would be raised in an effort to obtain a put/call price ratio of 1 (equality).

Similarly, if the actual external market price of the underlying security falls below the implied underlying reference price, the market participants, knowing they may have to buy the security at that price, will correspondingly tend to over value the put options and under value the call options at strike prices equal to the implied underlying reference price. This difference between the call price and the put price can be observed and be corrected for in an effort to achieve a put/call price ratio equal to 1.

As a specific, simplified example using actual numbers, refer to the following table. In the table, the underlying price is the external market price of the underlying security, commodity, etc. This price is not used in publishing the strike price, but is used by the market makers in pricing the fair value of a call or a put. The published strike price can start at any value, but for this example is shown starting at 20. For each iteration the difference between the call price and the put price is observed, and the published strike price is adjusted in such a way as to cause the market makers' call prices to become closer to the put prices for the next iteration. In the table, the adjustment is approximated to half the difference between the call and the put price, though this algorithm is for example purposes only. It can be easily seen that by the use of this feedback mechanism over multiple iterations the published strike price will gravitate naturally toward the underlying price without requiring direct knowledge of the external price.

| Iteration | Underlying price | Implied Underlying (Published) Strike Price | Fair Call Price (approximate) | Fair Put Price (approximate) | Adjustment |
| --- | --- | --- | --- | --- | --- |
| 1 | 35 | 20 | 15.50 | 0.05 | 7.725 |
| 2 | 35 | 27.73 | 8.00 | 0.10 | 3.95 |
| 3 | 35 | 31.68 | 3.75 | 0.25 | 1.75 |
| 4 | 35 | 33.43 | 1.80 | 0.50 | .65 |
| 5 | 35 | 34.08 | 1.10 | 0.80 | .15 |
| 6 | 35 | 34.23 | 1.00 | 0.85 | .075 |
| 7 | 34 | 34.31 | 0.80 | 1.20 | −.2 |
| 8 | 34 | 34.11 | 0.90 | 1.10 | −.1 |
| 9 | 34 | 34.01 | 0.95 | 1.00 | −.025 |

Note that in the table the published strike price iterates over time towards the underlying price of 35, and then in iteration 7, the underlying price changes, causing the published strike price to drop back closer to 34. This shows how the method would work in real-time with the underlying price changing along with the other parameters in the feedback loop.

This example uses one-half the difference between call and put prices to show how the procedure would work, but it should be pointed out that for options with strike prices very close to the underlying price, the change in option price with respect to underlying price (the "delta") is 0.5 (calls) or −0.5 (puts). This means that using the difference between the call and put premium as the adjustment factor might be the fastest method to quickly iterate to the correct value. The disadvantage of using large adjustments, however, is that the implied price might tend to overshoot the actual price depending on market conditions. These tradeoffs need to be considered in the actual implementation and may vary for underlying instruments that are more volatile than others.

It is in this way that the arbitrary reference price will naturally track the actual underlying price, pursuant to variable market conditions. A data stream will have been created that will contain the market's estimate of the correct price for the underlying instrument that takes into account every known price for the underlying, including any over-the-counter trades, exchange prices, or other quotations that market makers may have knowledge of. This will occur without any direct connection to, or dependence on, any exchange or external data source or stream for the price of the underlying instrument. Hence, the term "implied underlying price" accurately describes the function of this arbitrary reference data stream.

There are positive benefits in using an implied underlying price for an option's strike price as opposed to using the last trade price on an exchange. It allows the short-term options market to be completely self-contained as opposed to relying upon an external data vendor or exchange to provide the data stream. This prevents delay problems and has several other important positive effects. If a large market order to buy call options comes in, without the implied underlying feedback mechanism the entire order would be filled with the option strike prices being set at the last trade price of the underlying. With an implied underlying feedback mechanism in place, as the order is filled the strike price of the options filled later will be progressively higher to reflect the demand. In this way the implied underlying price provides an effective, self-contained mechanism to maintain fairness and effect equilibrium supply and demand pricing in the short-term options marketplace.

In addition, an implied underlying data stream as described above could be a valuable indicator providing advance notice of the intentions of market participants with a time frame attached to it. For example, if the put/call price ratio for the 5 minute options is higher than the put/call price ratio for the 30 minute options, it could be interpreted that the market might be pricing in a short term sell off followed by a recovery in the following 30 minutes. This advance knowledge of market action, with a time frame indication, would be a valuable tool for day traders or other market participants and in this way the implied underlying data stream could be resold in much the same way that existing exchanges sell real-time price data to various customers. The price disparity mentioned above may not exist for very long, however, because as will be shown below, differing put/call price ratios for different option time durations presents an arbitrage opportunity for market participants.

Although it is possible that the implied underlying calculation could use various mathematical algorithms, one possible method is to use a weighted average of the bid and ask price taking into account the bid or ask sizes. Using this method, the bid or ask size is multiplied by the bid or ask price and then the individual results are cumulatively added together and the total is divided by the cumulative size of bids and asks. This mathematical procedure is similar to the method for calculating the center of balance for an aircraft, for example, or a moment in the field of physics. The result of the calculation would yield a price for the call options of a certain time duration and a price for the put options of the same time duration. These results, when compared, would then be used to adjust the implied underlying price in a continuous effort to have the result for the call options be equal to the result for the put options for a specific time duration.

Alternatively, simply splitting the inside bid and ask price for the calls and the puts to derive the implied underlying price is an acceptable, computationally efficient method that could be used in place of the averaging described above. This method would also prevent market participants from manipulating the implied price by placing large out-of-the-money orders that will not be filled in order to cause the weighted average to move unfairly in one direction or the other.

Although, in this discussion, the description of this feedback mechanism was tailored for the creation of the implied underlying stream using short-term options listed by both time duration and floating strike price, the same feedback mechanism could also be used with options with fixed expiration but floating strike price. It is the variability over time of the standardized strike price of the option contract that allows the use of this process to arrive at an implied underlying price using feedback in the manner described.

It should also be pointed out that although particular attention has been given to an implied underlying price that has been derived by attempting to make the call prices equal to the put prices (1:1 ratio) on the exchange, there are other important ratios to pay attention to. For example, an implied price could be just as easily created using the methods described above where the put price is double the call price (a 2:1 ratio), or 3× the call price (a 3:1 ratio).

Synthetic Positions using Floating Options with Implied Underlying Strikes

There are benefits obtained by trading options with an implied underlying strike price as described above. Recall that the purpose of using the method was to arrive at a price estimate of the underlying security without requiring a direct connection to, or any dependence on, an external exchange or data source. The implied underlying price is continually computed as the strike price that results in equality between the put prices and the call prices. If the call prices are greater than the put prices, the implied underlying price is raised, and if the put prices are greater than the call prices, the implied underlying price is lowered as provided by the system of the invention. By using short-term options, effects of longer-term market conditions, such as interest rates or stock fundamentals, will not predominate.

Figure 2:
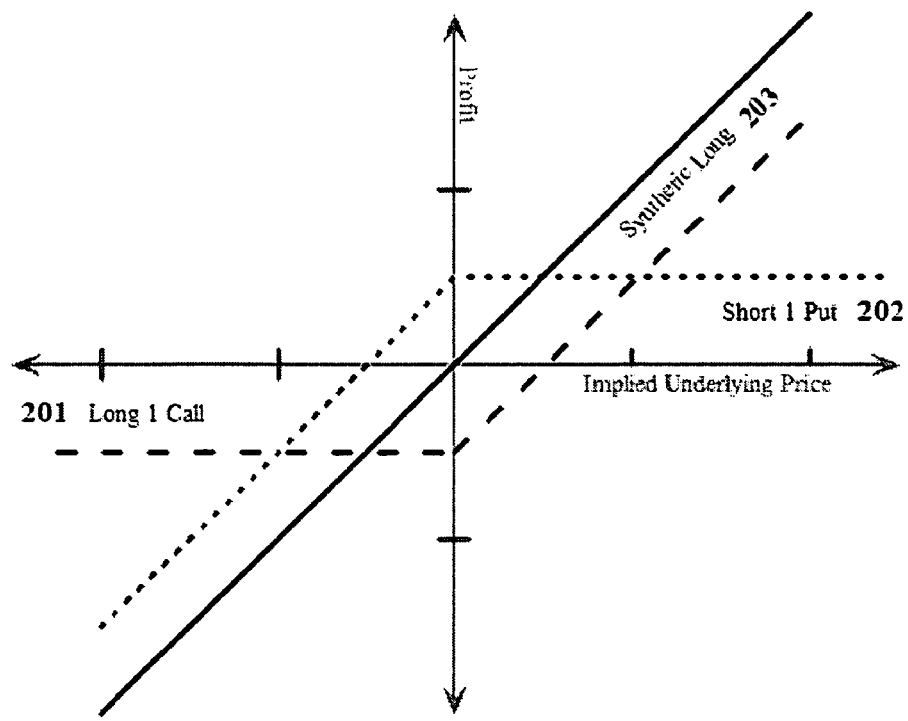
FIG. 2 shows profit and loss graphs for synthetic long and short positions in the diagrams on the top and bottom, respectively.
Figure 2:
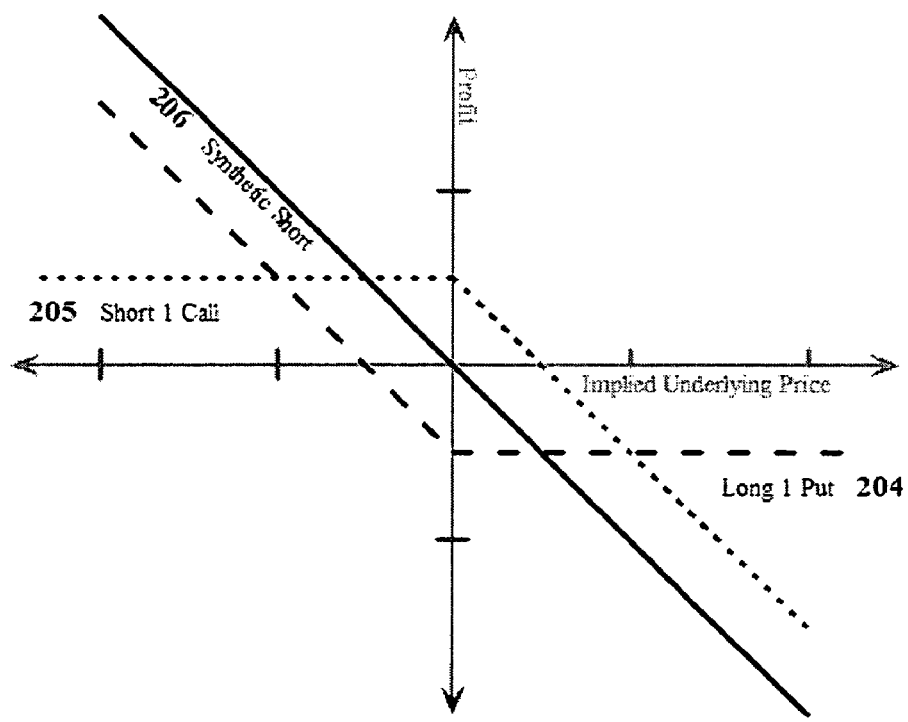

As shown in the position charts of FIG. 2, a synthetic long position 203 is created by buying a call 201 and selling a put 202 with the same parameters. The effect of this position is similar to buying the underlying stock—there is no difference in the profit/loss potential (delta) of the position, during the life of the options. Similarly, a synthetic short position 206 can be created by buying a put 204 and selling a call 205 with the same parameters.

Because the strike price for the options traded on the short-term option marketplace is always at the implied underlying price, and because the price of the calls always equals the price of the puts, it can be seen from the diagrams that the profit/loss graph of the synthetic long and short positions are equivalent to taking a position in the underlying, but with call and put premiums canceling causing the net cost of the position to be low. Hence, a long or short position on the underlying security can be entered into in the marketplace for a specific time duration with the call premium effectively canceling the put premium, and yet any profit (or loss) from the position will be the same during the life of the options just as if the underlying security had been purchased.

This potentially has very desirable benefits. For example, short-term market participants who buy and sell large amounts of securities throughout the trading day will be able to perform the same actions without moving large amounts of money in and out of the market. Even though the net purchase price of the position may at times be measured in pennies (or in certain conditions where the short price is greater than the long price even negative), the profit and loss of the position will remain the same as if the actual underlying security had been bought.

The following is a specific example using prices chosen for example purposes. Instead of paying $3000 for 100 shares of the underlying security that is trading at $30, a day trader might buy a 1-hour call for $5.01 and sell a 1-hour put for $4.99 to obtain the identical profit/loss potential over the next hour for a total cost of $5.01+(−$4.99)=$0.02. In both cases, if the underlying price then moves up $0.50 in the next hour, the trader would make $0.50×100 shares=$50−$0.02=$49.98. If, on the other hand, the underlying price were to drop $0.25 in the next hour, the trader would show a loss of $0.25×100 shares=$25+$0.02=$25.02. It should be obvious that the potential return on investment (leverage) for this type of synthetic position will be much larger than if the underlying security had been purchased instead.

This property of canceling premiums for opposing options occurs no matter what time duration the options are purchased with. Because of the way the marketplace operates, the opposing option prices for a given time duration will always be equal (or at least close to equal), and a synthetic long position or a synthetic short position can be entered into at the current implied underlying price with very small net cost to the trader. By contrast, with fixed time and price standardization synthetic positions almost never involve calls and puts with the same price unless the underlying security is trading directly at the strike price of an option series, a notably rare occurrence. This ready market for synthetic positions with canceling premiums is an important benefit of the system of the invention, not found in prior art systems.

Marketplace Functional Operation

Figure 3:
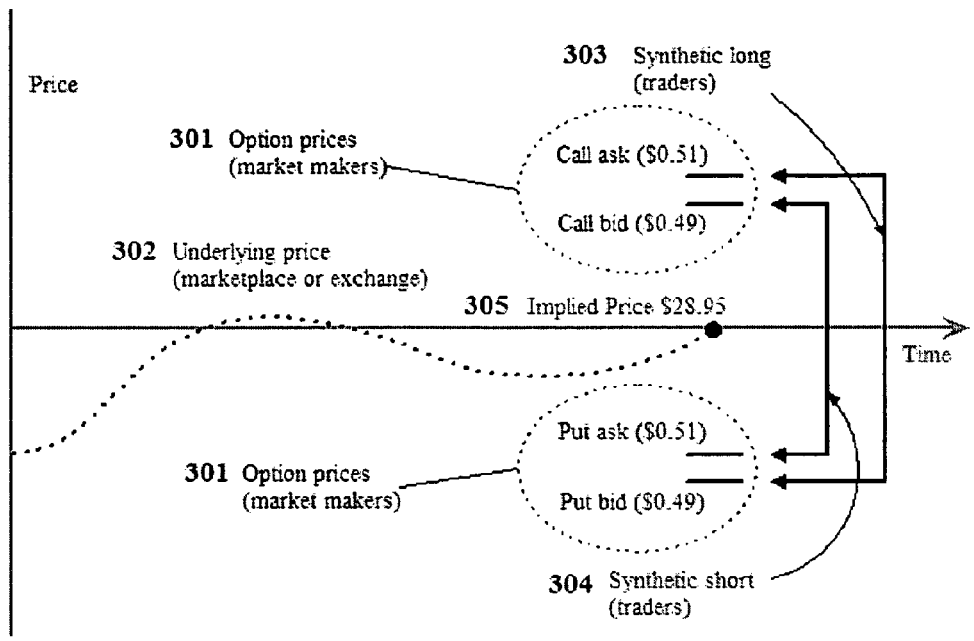
FIG. 3 shows a graph that represents market participant interactions and the price to buy a call at market (call ask) minus the price to sell a put at market (put bid) for a synthetic long position, or the price to buy a put at market (put ask) minus the price to sell a call at market (call bid) for a synthetic short position.

Taking a step back and viewing the system as a whole, it can be seen that each market participant will have a distinct role in the marketplace, as shown in FIG. 3. Market makers provide the bids and asks for options on the underlying security 301, the marketplace sets the current implied price 305 for the underlying security based on these bids and asks and the past value of the implied price 302, and traders provide the market direction by purchasing synthetic long 303 and synthetic short 304 positions. This is different from prior art in that the market makers only indirectly affect the price of the underlying security using the system of the invention. Recall from the Black-Scholes derivation for short-term options that the short-term options' price is affected primarily by volatility. The market makers' quotes on the options are therefore representative of the probability of price movement in a given direction over a given time frame. As the probability for price movement in the up direction increases, the price of the calls will go up, and vice-versa for price movement in the down direction. Viewed in this way, the marketplace sets the implied underlying price so that the expected profit for up movement (calls) is equal to the expected profit for down movement (puts) in the underlying's price.

Described a different way, traders on the underlying security provide the market direction by entering into positions at minimal cost by initially placing two option market orders simultaneously: matching bids on puts and asks on calls for a synthetic long position, or asks on puts and bids on calls for a synthetic short position. This role of the trader is to provide an opinion (at low cost) for market direction by buying premium in the direction they believe the market will go and selling premium to offset in the other direction. The market makers set the prices for these options based on their market outlook and on the demand (the number of opinions from traders) for each type of option. Finally, it is the marketplace itself that determines the fair price of the underlying security by continually adjusting the implied underlying price based on the market makers' quotations for each class of option.

Using the example prices in the diagram of FIG. 3 it can be seen that there will be a small premium to buy a synthetic long 303 or short 304 position at market. In the diagram, this price is $0.02 for either a synthetic long position or a synthetic short position, due to the symmetry (in the diagram for simplicity) of put prices and call prices 301. This represents the price to buy a call at market (call ask) minus the price to sell a put at market (put bid) for a synthetic long position, or the price to buy a put at market (put ask) minus the price to sell a call at market (call bid) for a synthetic short position. This price is the total cost of entering the position, as compared to paying $2895 (the underlying price in the diagram) for 100 contracts of the underlying. Using the system of the invention in this way, the total cost of a (synthetic) long or short position in the underlying security will be related to the spread between bid and ask of the floating options on the underlying.

For a short-term options marketplace with multiple option durations being traded, there may be a separate implied underlying price for each option time duration. Alternatively, in another embodiment, a single implied underlying price could be generated using all option time durations as the input. For the case of separate implied underlying prices, if the implied underlying price for one option time duration varies from the implied underlying price for a different option time duration, an arbitrage opportunity will become available by buying a synthetic long at the lower price and buying a synthetic short at the higher price. From this observation it can be seen that the different implied underlying prices in the marketplace corresponding to different option time durations will to tend to gravitate towards each other due to the existence of this arbitrage potential.

The following table summarizes some of the reasons various market participants might have for trading options of short time duration as described using the system of the invention.

| Buying Premium | Selling Premium |
| --- | --- |
| Enter into synthetic long and short positions for minimal cash out of pocket (involves both buying and selling premium of calls and puts) | Enter into synthetic long and short positions for minimal cash out of pocket (involves both buying and selling premium of calls and puts) |
| Short-term risk management (legging risk, etc.) | Potential steady, short-term income from covered call/put writing |
| Need to buy or sell large blocks of underlying security | Potential steady, short-term income from naked call/put writing (more risk) |
| Short-term one-sided speculation (buying calls, puts) | |

Marketplace Implementation

One preferred embodiment of a marketplace suitable for trading short-term micro-options in the manner described is a distributed over-the-counter (OTC) marketplace operating as a bulletin board facilitating the trading of such options. The trades taking place between counter parties would remain OTC but would be facilitated by a centralized server consisting primarily of a bulletin board and implied underlying price calculation service. Optionally, a central clearing member could be used to provide credit worthiness guarantees.

Figure 4:
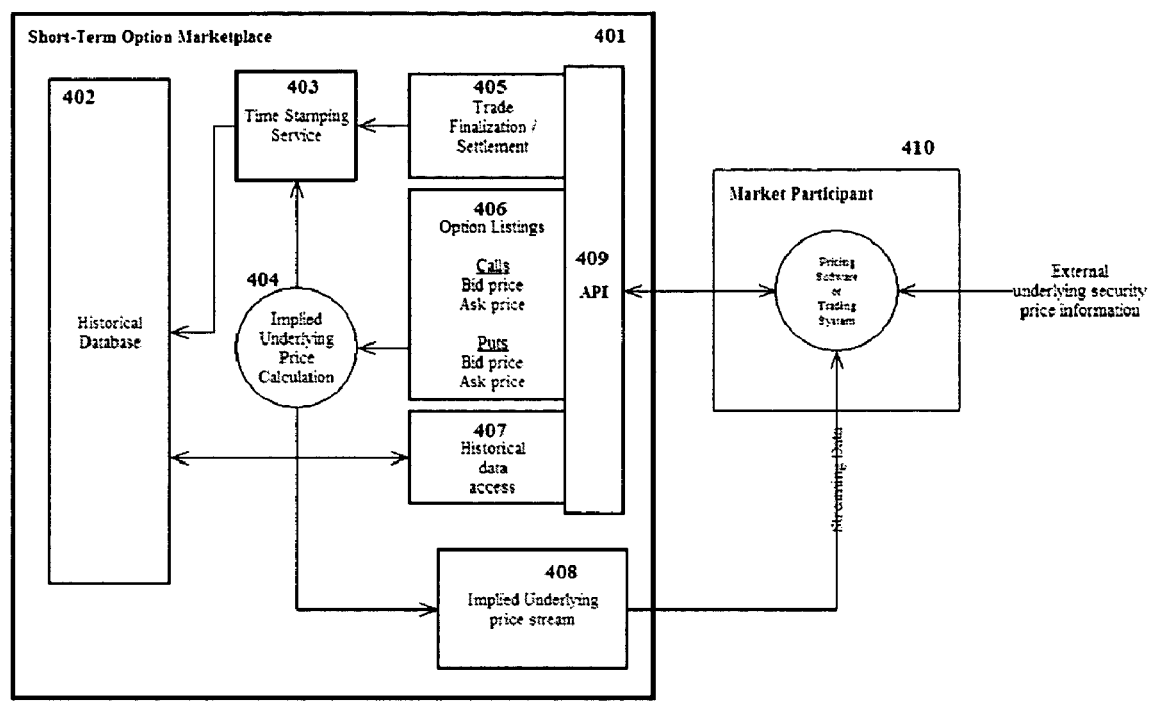
FIG. 4 shows a system diagram in which a market participant interacts with an OTC bulletin board, along with historical data access and time stamping services according to one embodiment of the present teachings.

In this embodiment, the centralized server contains data processing means consisting of one or more central processing units (CPU), one or more network connections and an application programming interface (API) for accessing services provided by the centralized server, data broadcasting means for disseminating floating option price quotations and an implied underlying price to market participants, a cryptographic core capable of digitally signing trade summary information as a means for providing login authentication, time stamping and trade authentication to market participants, storage means capable of storing historical implied underlying prices and price quotations from a plurality of market participants. The functional pieces of such an embodiment is shown in the diagram of FIG. 4. The short-term option marketplace 401 contains a historical database of trades 402, a time stamping service 403 and implied underlying price calculation means 404. The marketplace 401 provides an application programming interface (API) 409 to market participants 410. The API 409 consists of at a minimum trade finalization and settlement functionality 405, quote posting and retrieval 406 and historical data access 407. The implied underlying price calculation results in an implied underlying price that varies over time and creates a stream of implied underlying prices 408 which are provided to market participants 410.

In one embodiment, digitally signed time stamped trade information is generated using data processing means and cryptographic techniques, such as public key infrastructure (PKI) techniques. A private key is securely kept and is used to digitally sign trade information packets in a secure manner that cannot be forged. Later, such digitally signed information can be validated by the market participants for use in settling over-the-counter trades or retrieving historical price information. Other methods of generating cryptographically secure time stamps could alternatively be used in place of PKI.

Application programming interface (API) means provided by one preferred embodiment of the system of the invention include the following services:

Secure login authentication
Price quotation submission
Price quotation modification
Price quotation cancellation
Trade time stamping
Strike price and expiration time assignment
Price quotation retrieval
Historical trade retrieval
Time stamp validation In one embodiment, data broadcasting means to disseminate price information to market participants can take many different forms as are presently used in the systems of the prior art to broadcast price and trade data to market participants, the most convenient of which is likely to be the internet as a transmission medium. Using the internet for broadcasting in this manner might involve streaming data packets, point-to-point connectivity, or broadcast packets sent out to every participant in the network. In addition, advanced technology for broadcasting using router technology could optionally be utilized to ease the data processing requirements of data stream duplication.

Market participants will most likely need to access the marketplace through a secure network connection, such as a dedicated leased line or a virtual private network (VPN) over a public network. A VPN network will require the use of encryption techniques to secure packets running over the network. In addition to this transport layer encryption used in the VPN, there needs to be an authentication layer whose purpose is to authenticate the external connection as coming from a known market participant (who has the correct access privileges). The information used in the authentication process would then also be available for use in the historical database to allow historical time stamping data and connection authentication data to be stored, either anonymously or with a digital identification tag attached.

In one embodiment, a sophisticated data processing system is used for the implementation of the short-term options marketplace because of the short time frames of the securities involved. This data processing system preferably includes one or more microprocessor-based central processor units (CPU) interconnected with multiple I/O (input/output) controllers, segmented memory in both semiconductor and magnetic disk form (i.e., immediate memory and permanent storage), communication ports for distributed processing possibly using a network and real time input communication for, e.g., incoming stock quotes (i.e., real time quotation of the option's underlying security price). The controlling program can be written in various commercially well-known programming languages (e.g., Cobol, "C", C++, Pascal, etc.), as long as the resulting executable version can be compiled in a manner compatible with hardware selected for the central processor and any peripheral workstations. A robust, reliable database needs to be a part of the implementation in order to store trade, time and price history.

Figure 5:
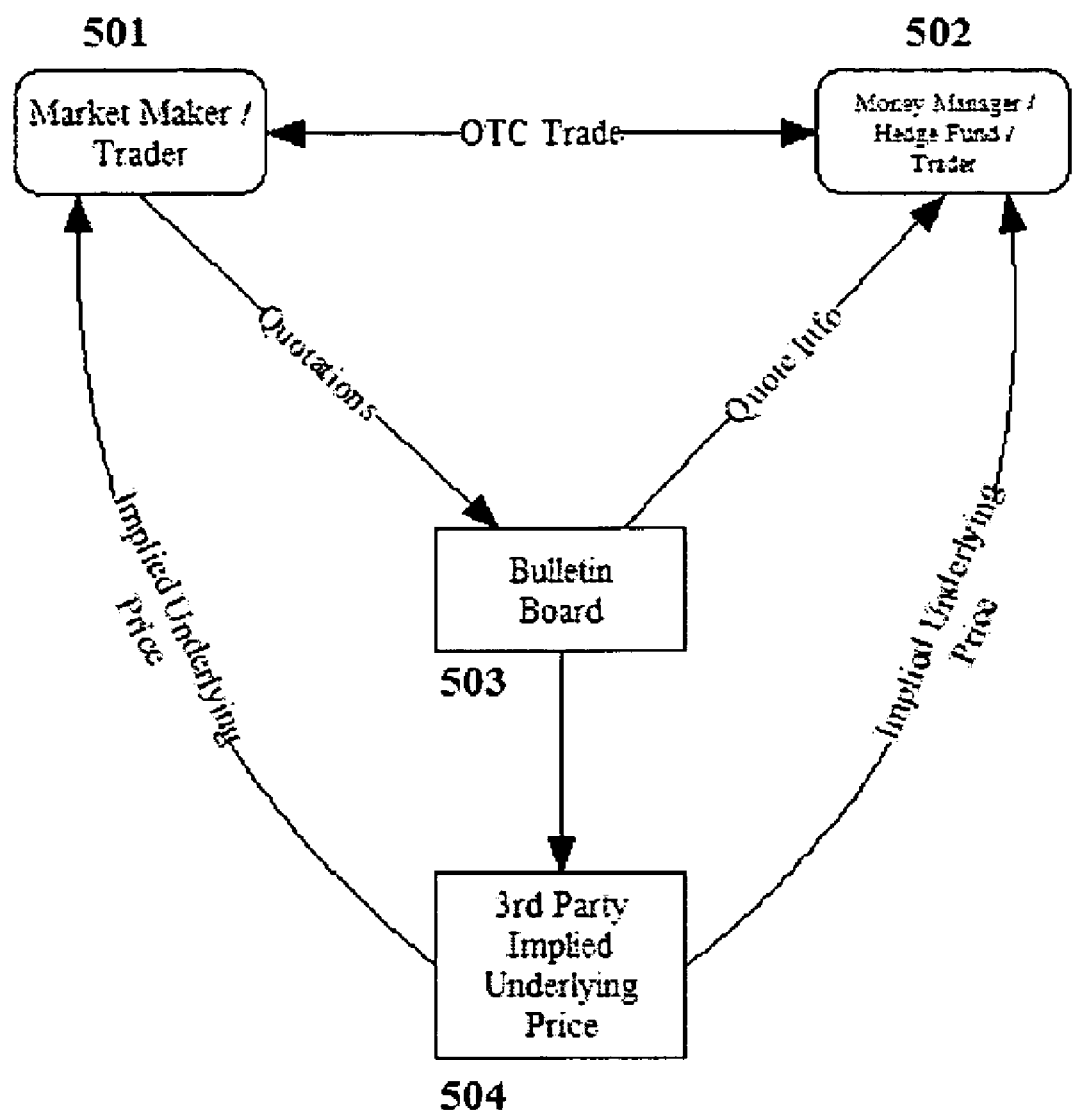
FIG. 5 shows a block diagram of how a trilateral option trade can be completed using the system of the invention.

Because each option trade will tend to be unique, the product lends itself to over-the-counter type trading because there is no available secondary market. By operating the marketplace as a distributed market, the system will be able to provide other desirable features of a conventional marketplace such as price discovery, competition and transparency. This embodiment of the system of the invention is therefore an over-the-counter trade facilitator bringing tangible benefits to OTC markets without requiring trades to be completed centrally as in a conventional exchange. With this embodiment, an OTC trade is facilitated as shown in FIG. 5. A market maker, trader or other quote provider 501 posts quotations on the central bulletin board 503, which are retrieved by money managers, hedge funds, traders, or other market participants 502 in order to complete a trade in an OTC manner. The implied underlying price is calculated by an independent neutral third party 504 and is used to complete the trade by both the quote provider 501 and the OTC counter party 502. This method of completing a trilateral OTC option trade involves three distinct parties: a buyer, a seller, and a neutral contract parameter provider.

In one embodiment, the individual market makers or traders would be able to access the service to post or retrieve the most recent price quotes in an anonymous fashion, then use this price information to obtain a secure, anonymous network connection to the market maker on the other side of the trade, and subsequently complete the trade in an over-the-counter capacity. In this type of implementation, the two sides of the trade would utilize the service for its central quote posting, its option trade time stamping service, the universal agreement between counter parties to use the implied underlying price stream for option strike price, and the market transparency and anonymity that is provided by the price dissemination feature. The over-the-counter trade would be completed using a separate means suitable for performing such action.

Figure 6:
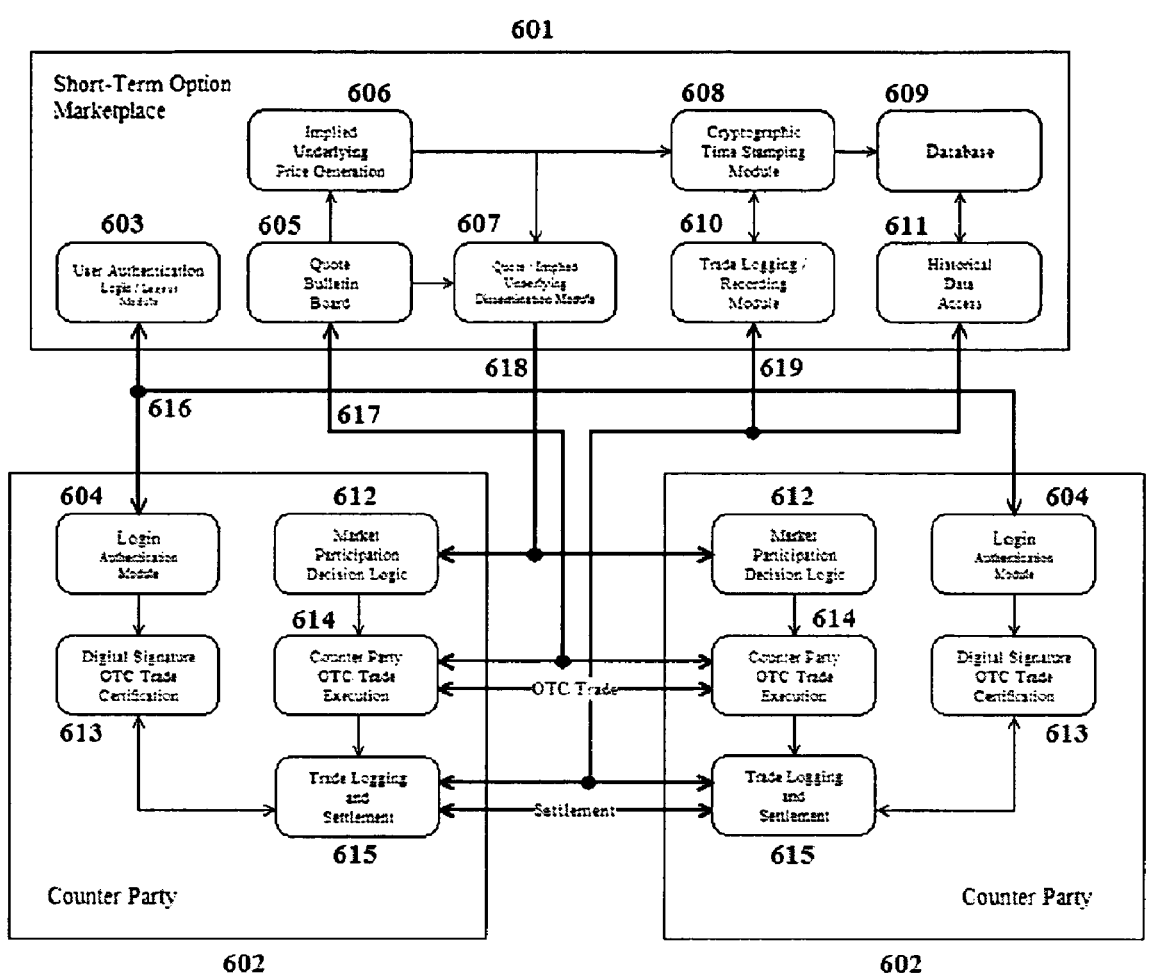
FIG. 6 shows a detailed functional block diagram of one embodiment of the functional pieces of the system of the invention facilitating an OTC trade between market counter parties.

A detailed functional diagram of one preferred embodiment of the system of the invention is shown in FIG. 6. The short-term option marketplace 601 facilitates an OTC trade between two counter parties 602 in this embodiment. Market participants login over a VPN or other network-type connection using a secure connection means 616 between the user authentication module 603 and the local login module 604. Each counter party may be assigned a unique, secure digital identification value at this time to be used in the trade certification module 613. Once authenticated, each counter party uses proprietary decision logic 612 to determine whether to post a quotation or initiate a trade on an existing quotation. This decision is made using up-to-date information provided anonymously in one embodiment through the quote/implied underlying dissemination module 607 using appropriate data broadcasting or other price transmission means 618. Once a market action has been determined by the counter party, detailed quote information containing counter party identification information in one embodiment is either provided or retrieved from the quote bulletin board 605, depending on the desired action, using secure network means 617. An OTC trade is completed between counter parties at this point using OTC trade execution means 614. Once the trade is completed, trade information is finalized and digitally signed 613 by each counter party 615 and is sent to the trade logging/recording module 610 over secure network means 619. A time stamp and corresponding implied strike price is assigned to the trade data 608 and stored in database means 609 for future retrieval. At the time of settlement, counter parties can retrieve and confirm trade data using historical data access means 611 over a secure network means 619. During operation, the implied underlying price is computed 606 based on posted quotations 605 and provided for dissemination by the implied underlying dissemination module 607 and made available to the cryptographic time stamping module 608. Time stamps in this embodiment consist of digitally signed trade information containing at a minimum the current time, the current implied underlying price assigned to the trade and counter party identification.

One embodiment of the system would offer a basis for "sideline" over-the-counter options to be traded where the strike and expiration parameters of the options could be assigned by the counter parties and posted to a bulletin board to facilitate OTC trading. These "sideline" option trades could make use of the anonymity and bulletin board facilities of the marketplace at the discretion of the marketplace participants, but would not be part of the mainstream operation of the marketplace, that is, the premiums set by the market participants would not affect the implied underlying price calculation or the other aspects of the marketplace operation.

The marketplace could allow traders in one embodiment the ability to buy a long or a short position in the underlying by allowing market makers to quote prices for the synthetic positions with the long and short option premiums combined into one quotation. These long or short positions would expire at the time of expiration of the composite options, and would be convertible to the underlying security upon exercise if profitable, otherwise, would represent a liability (loss). For example, both a "day long" synthetic long and a "day short" synthetic short would be quoted at the price difference of composite option premiums with no mention of the actual call/put premiums using this method. Other option combinations could be quoted in a similar manner, as desired by market participants or the marketplace.

In operating the system as a bulletin board service with the trade taking place between counter parties in an over-the-counter manner, there are complexities involved having to do with settlement. Because of the short-term nature of the trades and the complexities involved with no secondary market and no fixed, specific expiration times, it is desirable in one embodiment to deliver the options contracts into an intermediate derivative contract for which there does exist a secondary market or fixed expiration time. Such an intermediate derivative contract could take the form of a futures or a forward contract, for example.

These intermediate contracts would then be settled at a specific and predetermined time in the future which would allow opposing positions to cancel, and in addition, rapid option trades throughout the day would then cancel each other out and be settled at a single time, for example at the end of the trading day or at midnight every 24-hour period. In this way, the complexities of having unique option contracts for every trade can be simplified by the use of such an intermediate derivative product.

In one embodiment, the system of the invention could allow for the outright purchase of the intermediate derivative at the end-of-day implied underlying price in order for market participants to be able to settle or close out their open positions at periodic time intervals. This allows the marketplace to be completely self-contained with market participants being able to close positions, or even cash-settle positions, without being forced to take delivery of an underlying security for which there may be complex or time-consuming transactions involving interactions outside the marketplace.

Market participants who would actually want to take delivery of the underlying security at the intermediate derivative contract's expiration would not have to close out their positions as described above, of course. Such a decision to take delivery (or to deliver), however, would only have to be made at a single point in time, say end-of-day, as opposed to each individual option contract's expiration throughout the day.

In a different embodiment of the system of the invention a centralized clearing member would facilitate the settlement of the option contracts, or alternatively, facilitate the settlement of the option contracts through the use of the intermediate derivative product described above. The advantages of such a centralized clearing member would be to alleviate credit worthiness concerns for over-the-counter market participants, for example, as well as to assist with the complexities involved with managing the settlement of the many trades that might be placed over the course of doing business.

Using a centralized clearing member in this fashion, the system of the invention would facilitate the settlement procedures by providing summary information, daily for example, of market participants' trading activity to the central clearing member. This information could then be used to authenticate, and settle market positions at end-of-day.

It is to be noted that although numerous specific examples have been given to assist in an appreciation and understanding of the generic concepts of this disclosure and inventions included therein, the examples are not intended to be limiting with respect to the claims and the scope of the invention.

What is claimed is:

1. A method of creating an implied underlying price stream through a processor with external communication from markets, consisting of a sequence of arbitrary reference prices, the method comprising: a) providing on the processor an arbitrary reference price to market participants consisting essentially of other processors, b) enabling the other processor market participants in communication with the processor to price call and put option contracts for an underlying instrument using the arbitrary reference price as a strike price for the options, c) the market, through the processor, deriving an indicated call price and an indicated put price from one or more prices that the other processor market participants set, and d) the market, through the processor, adjusting the arbitrary reference price to an underlying reference price by a process selected from the group consisting of: i) the market, through the processor, raising the arbitrary reference price if the indicated call price is greater than the indicated put price; ii) the market, through the processor, lowering the arbitrary reference price if the indicated put price is greater than the indicated call price; and iii) the market, through the processor, leaving the arbitrary reference price the same if the indicated call price is equal to the indicated put price; and the price stream enabling the processor to confirm a contract with the market and register within the market that contract as enforceable and completing a contract between two other processors.

2. The method of claim 1 wherein the market assigns contract parameters to an option contract subsequent to a buyer and a seller initiating a trade at a non-zero price, comprising at least two of: a) assigning an expiration time to the option contract based on a time of the trade and a time duration of the option contract, b) the market assigns an expiration time to the option contract based on a current or future time and a time duration of the option contract, c) the market assigns a strike price to the option contract based on a price of the underlying and a floating strike price of the option contract, d) the market assigns a strike price to the option contract based on the implied underlying price and a floating strike price of the option contract, or e) assigning a strike price to the option contract based on an implied underlying price established by the implied underlying price consisting of a sequence of arbitrary reference prices, the method comprising: a) a first processor in the market providing an arbitrary reference price to market participants, b) the market communicating through processors allowing market participants to price derivative contracts based on the arbitrary reference price, and c) adjusting the arbitrary reference price in response to the activity of the market participants; and a floating strike price of the option contract.

3. The method of claim 1 where the underlying contract is a future on the underlying cost of purchase of a commodity or equity.

4. The method of claim 1 where the underlying contract is a forward on the underlying cost of purchase of a commodity or equity.

5. The method claim 1 wherein a trilateral option trade is completed by a method which consists essentially of: a) initiating an option contract trade between a buyer and a seller with strike price and expiration time unspecified at the time of initiation of the trade, and b) assigning parameters to the option contract from an independent third source.

6. The method claim 1 further comprising broadcasting data by a data broadcasting system to disseminate the implied underlying price to market participants.

7. A method of creating an implied underlying price stream in a market communicating through processors, the implied underlying price consisting of a sequence of arbitrary reference prices, the method comprising: a) a first processor in the market providing an arbitrary reference price to market participants, b) the market communicating through processors enabling market participants to price derivative contracts based on the arbitrary reference price, and c) adjusting the arbitrary reference price in response to the activity of the market participants;

wherein the market communication through processors enables user on a processor within the market to confirm a contract within the market and register that contract within the market as enforceable and completing a contract between two other processors.

* * * * *